(12) United States Patent
Saponja et al.

(10) Patent No.: US 10,590,751 B2
(45) Date of Patent: Mar. 17, 2020

(54) SYSTEMS AND APPARATUSES FOR SEPARATING WELLBORE FLUIDS AND SOLIDS DURING PRODUCTION

(71) Applicant: Heal Systems LP, Calgary (CA)

(72) Inventors: Jeffrey Charles Saponja, Calgary (CA); Robbie Singh Hari, Calgary (CA)

(73) Assignee: Heal Systems LP, Calgary (CA)

( * ) Notice: Subject to any disclaimer, the term of this patent is extended or adjusted under 35 U.S.C. 154(b) by 214 days.

(21) Appl. No.: 15/671,600

(22) Filed: Aug. 8, 2017

(65) Prior Publication Data

US 2018/0087367 A1    Mar. 29, 2018

Related U.S. Application Data

(63) Continuation of application No. 15/067,732, filed on Mar. 11, 2016, now abandoned, which is a
(Continued)

(30) Foreign Application Priority Data

Sep. 17, 2013    (CA) ...................................... 2827459

(51) Int. Cl.
*E21B 43/38*    (2006.01)
*E21B 33/12*    (2006.01)
(Continued)

(52) U.S. Cl.
CPC .............. *E21B 43/38* (2013.01); *E21B 33/12* (2013.01); *E21B 43/12* (2013.01); *E21B 43/121* (2013.01);
(Continued)

(58) Field of Classification Search
CPC ........................................................ E21B 43/34
See application file for complete search history.

(56) References Cited

U.S. PATENT DOCUMENTS

| 1,554,835 A | 10/1925 | Barrett |
| 1,674,815 A * | 6/1928 | Barnhart ............... E21B 43/121 166/105.5 |

(Continued)

FOREIGN PATENT DOCUMENTS

| CA | 2120283 | 10/1995 |
| EP | 0 802 303 | 10/1997 |

(Continued)

OTHER PUBLICATIONS

Chinese Office Action issued in Application No. 211480060857.0, dated Dec. 4, 2017 (English Translation).
(Continued)

*Primary Examiner* — William D Hutton, Jr.
*Assistant Examiner* — Steven A MacDonald
(74) *Attorney, Agent, or Firm* — Fish & Richardson P.C.

(57) ABSTRACT

There is provided apparatuses, and related systems, for effecting production of oil from a reservoir. A separator is provided and configured to mitigate problems with solid debris accumulation within the wellbore. A system is also provided, including the separator, and is disposed within a wellbore. A pump is also provided, and disposed in fluid communication with, and downstream from, the separator, for receiving reservoir fluids from which gaseous and solid material have been separated by the separator.

20 Claims, 15 Drawing Sheets

Related U.S. Application Data continuation of application No. PCT/CA2014/000695, filed on Sep. 12, 2014, which is a continuation-in-part of application No. 14/026,170, filed on Sep. 13, 2013, now abandoned.

(51) Int. Cl.
*E21B 43/12* (2006.01)
*B01D 17/00* (2006.01)
*B01D 17/12* (2006.01)
*B01D 19/00* (2006.01)

(52) U.S. Cl.
CPC .............. *B01D 17/00* (2013.01); *B01D 17/12* (2013.01); *B01D 19/0042* (2013.01)

(56) References Cited

U.S. PATENT DOCUMENTS

| | | | |
|---|---|---|---|
| 1,973,650 A | | 9/1934 | O'Brien |
| 2,345,710 A | * | 4/1944 | Lybyer .................... F04B 53/00 166/105.1 |
| 2,429,043 A | * | 10/1947 | Barnhart .................... F04F 1/06 166/236 |
| 2,883,940 A | * | 4/1959 | Gibson .................... E21B 43/38 166/105.5 |
| 3,004,497 A | * | 10/1961 | Lybyer .................... E21B 43/38 166/105.1 |
| 3,109,490 A | | 11/1963 | Baker |
| 3,182,726 A | | 5/1965 | Stone, Jr. |
| 4,217,168 A | | 8/1980 | Ridgway et al. |
| 4,275,790 A | * | 6/1981 | Abercrombie ........ E21B 43/121 166/105.5 |
| 4,372,393 A | | 2/1983 | Baker |
| 4,383,578 A | | 5/1983 | Baker |
| 4,390,061 A | | 6/1983 | Short |
| 4,513,817 A | | 4/1985 | Weinberg |
| 4,676,308 A | * | 6/1987 | Chow .................... E21B 43/38 166/105.5 |
| 4,951,746 A | | 8/1990 | Setterberg, Jr. |
| 5,257,665 A | | 11/1993 | Watkins |
| 5,271,725 A | | 12/1993 | Freet et al. |
| 5,488,993 A | | 2/1996 | Hershberger |
| 5,515,475 A | | 5/1996 | Gupta et al. |
| 5,535,825 A | | 7/1996 | Hickerson |
| 5,547,021 A | | 8/1996 | Raden |
| 5,899,273 A | | 5/1999 | Jung |
| 5,915,475 A | | 6/1999 | Wells et al. |
| 6,039,121 A | | 3/2000 | Kisman |
| 6,119,771 A | | 9/2000 | Gano et al. |
| 6,547,005 B2 | | 4/2003 | Haheim |
| 6,651,740 B2 | | 11/2003 | Kobylinski et al. |
| 6,672,392 B2 | | 1/2004 | Reitz |
| 6,688,395 B2 | | 2/2004 | Maguire et al. |
| 6,854,518 B1 | | 2/2005 | Senyard et al. |
| 7,063,161 B2 | | 6/2006 | Butler et al. |
| 7,100,695 B2 | | 9/2006 | Reitz |
| 7,104,321 B2 | | 9/2006 | Carruth |
| 7,174,959 B2 | | 2/2007 | Pratt |
| 7,717,182 B2 | | 5/2010 | Butler et al. |
| 7,776,085 B2 | | 8/2010 | Bemero et al. |
| 7,909,092 B2 | | 3/2011 | Cobb |
| 8,006,751 B2 | | 8/2011 | Lambert et al. |
| 8,006,756 B2 | | 8/2011 | Mazzanti |
| 8,051,907 B2 | | 11/2011 | Cobb |
| 8,397,811 B2 | * | 3/2013 | Reid .................... E21B 43/121 166/105.5 |
| 8,955,598 B2 | * | 2/2015 | Brown .................. E21B 43/121 166/105.5 |
| 8,985,221 B2 | | 3/2015 | Mazzanti |
| 9,022,106 B1 | * | 5/2015 | McCoy .................. E21B 43/126 166/105.5 |
| 2005/0081718 A1 | * | 4/2005 | Carruth .............. B01D 19/0042 96/212 |
| 2006/0113082 A1 | | 6/2006 | Moffett et al. |
| 2009/0194293 A1 | | 8/2009 | Stephenson et al. |
| 2010/0319926 A1 | * | 12/2010 | Reid .................... E21B 43/128 166/372 |
| 2011/0024121 A1 | | 2/2011 | Skeates et al. |
| 2011/0214880 A1 | | 9/2011 | Rogers |
| 2011/0214883 A1 | | 9/2011 | Patel |
| 2012/0006543 A1 | | 1/2012 | Cox et al. |
| 2013/0032341 A1 | * | 2/2013 | Raglin .................. E21B 43/127 166/265 |
| 2013/0062072 A1 | | 3/2013 | Alvarez et al. |
| 2013/0153203 A1 | | 6/2013 | Lauderdale |
| 2014/0020775 A1 | | 1/2014 | Iboldi et al. |
| 2015/0247390 A1 | | 9/2015 | Mazzanti |

FOREIGN PATENT DOCUMENTS

| | | |
|---|---|---|
| GB | 2183171 | 6/1987 |
| GB | 2450565 | 12/2008 |
| WO | WO 2013/015826 | 1/2013 |
| WO | WO 2013/016097 | 1/2013 |

OTHER PUBLICATIONS

Extended European Search Report issued in EP14844941.6 dated Jul. 25, 2017.
Extended European Search Report issued in EP18157720.6 dated May 22, 2018.
Office Action issued in Australian Application No. 2014321104, dated Feb. 16, 2018.
Office Action issued in Eurasian Patent Application No. 201690585, dated Feb. 20, 2018 (with English Translation).
Office Action issued in Chinese Application No. 201480060857.0, dated Jul. 20, 2018 (With English Translation) (7 pages).

* cited by examiner

SYSTEMS AND APPARATUSES FOR SEPARATING WELLBORE FLUIDS AND SOLIDS DURING PRODUCTION

CROSS-REFERENCE TO RELATED APPLICATIONS

This application is a continuation from U.S. Ser. No. 15/067,732 filed Mar. 11, 2016, which is a continuation from International Patent Application No. PCT/CA2014/000695, filed Sep. 12, 2014, which is a continuation-in-part from U.S. Ser. No. 14/026,170 filed Sep. 13, 2013, and claims the benefit of priority to Canadian Patent Application No. 2,827,459 filed Sep. 17, 2013. The entire contents of each of the above-referenced disclosures are specifically incorporated herein by reference without disclaimer.

FIELD

The present disclosure relates to artificial lift systems, and related apparatuses, for use in producing hydrocarbon-bearing reservoirs.

BACKGROUND

Gas interference is a problem encountered while producing wells, especially wells with horizontal portions. Gas interference results in downhole pumps becoming gas locked and/or low pump efficiencies. Downhole packer-type gas anchors or separators are provided to remedy gas lock. However, packer-type gas anchors are generally not design to effectively separate and manage debris. They are also relatively expensive. Further, the packers on packer-type gas anchors are susceptible to having debris accumulate thereon and, as a result, becoming stuck within the wellbore tubular against which it forms a seal and/or reducing their ability to separate gas or blocking flow passages within the packer-type gas anchor. A stuck packer makes it difficult to remove production tubing from the wellbore or to access the wellbore below it, such as during a workover. Such attempt at removal may also damage the packer or wellbore casing, thereby rendering the packer-type gas anchor unusable for future production or even loss of the wellbore.

SUMMARY

In one aspect, there is provided a system for processing at least reservoir fluids within a wellbore that is disposed within an oil reservoir, the system comprising a wellbore fluid conductor disposed within the wellbore, the wellbore fluid conductor comprising: a separator co-operating fluid conductor; a liner, the liner being coupled to and disposed in sealing, or substantially sealing, engagement with the separator co-operating fluid conductor, and including a liner fluid passage for receiving reservoir fluids from the reservoir and for conducting at least reservoir fluids; and a separator including: a first inlet port disposed in fluid communication with the liner fluid passage for receiving at least reservoir fluids from the liner fluid passage; a first outlet port; a reservoir fluid-conducting passage extending between the first inlet port and the first outlet port; a second inlet port disposed downhole relative to the first outlet port; a second outlet port; a gas-depleted fluid conducting passage extending between the second inlet port and the second outlet port; a co-operating surface portion co-operating with the separator co-operating fluid conductor to define an intermediate fluid passage therebetween for effecting fluid communication between the first outlet port and the second inlet port; and a sealing surface disposed in sealing, or substantially sealing, engagement with the liner.

In another aspect, there is provided a system for processing at least reservoir fluids within a wellbore that is disposed within an oil reservoir, the system comprising: a wellbore fluid conductor disposed within the wellbore; and a liner coupled to and sealingly, or substantially sealingly, engaged with the wellbore fluid conductor for conducting reservoir fluid, the wellbore fluid conductor including a wellbore fluid conductor passage and the liner defining a liner fluid passage downhole from, and in fluid communication with, the wellbore fluid conductor passage; and a separator disposed in the wellbore fluid conductor passage, the separator including an inlet port for receiving at least reservoir fluid and an outlet port for delivering gas-depleted reservoir fluid, the inlet port being disposed in fluid communication with the liner fluid passage and in substantial sealing engagement with the liner to prevent, or substantially prevent, the reservoir fluid from bypassing the inlet port.

In another aspect, there is provided a system for processing at least reservoir fluids within a wellbore that is disposed within an oil reservoir, the system comprising a wellbore fluid conductor disposed within the wellbore, the wellbore fluid conductor comprising: a separator co-operating fluid conductor including: a downhole wellbore fluid passage for receiving reservoir fluids from the reservoir and for conducting at least reservoir fluids; and a constricted portion; a separator including: a first inlet port disposed in fluid communication with the downhole wellbore fluid passage for receiving at least reservoir fluids from the downhole wellbore fluid passage; a first outlet port; a reservoir fluid-conducting passage extending between the first inlet port and the first outlet port; a second inlet port disposed downhole relative to the first outlet port; a second outlet port; a gas-depleted fluid conducting passage extending between the second inlet port and the second outlet port; a co-operating surface portion co-operating with the separator co-operating fluid conductor to define an intermediate fluid passage therebetween for effecting fluid communication between the first outlet port and the second inlet port; and a separator sealing surface disposed in the sealing, or substantially sealing, engagement with the constricted portion.

In another aspect, there is provided a system for processing at least reservoir fluids within a wellbore that is disposed within an oil reservoir, the system comprising a wellbore fluid conductor disposed within the wellbore, the wellbore fluid conductor comprising: a separator co-operating fluid conductor including a downhole wellbore fluid passage for receiving reservoir fluids from the reservoir and for conducting at least reservoir fluids; a separator including a first inlet port disposed in fluid communication with the liner fluid passage for receiving at least reservoir fluids from the liner fluid passage; a first outlet port; a reservoir fluid-conducting passage extending between the first inlet port and the first outlet port; a second inlet port disposed downhole relative to the first outlet port; a second outlet port; a gas-depleted fluid conducting passage extending between the second inlet port and the second outlet port; and a co-operating surface portion co-operating with the separator co-operating fluid conductor to define an intermediate fluid passage therebetween for effecting fluid communication between the first outlet port and the second inlet port; and a sealing member; wherein the sealing member is disposed between a sealing member engaging surface portion of the separator co-operating fluid conductor and a sealing member engaging surface portion of the separator to define a sealed interface, and such that fluid flow, across the sealed interface, is prevented, or substantially prevented, wherein the sealing member is disposed downhole relative to the second inlet port; and wherein the sealing member, including an exposed surface portion, that is disposed in fluid communication with the intermediate fluid passage, is extending across a gap, between the separator and the separator co-operating fluid conductor, having a minimum distance of less than 2.5 millimitres.

In another aspect, there is provided a system for processing at least reservoir fluids within a wellbore that is disposed within an oil reservoir, the system comprising: a separator co-operating fluid conductor disposed within the wellbore, and including a downhole wellbore fluid passage for receiving reservoir fluids from the reservoir and for conducting at least reservoir fluids; a separator including: a first inlet port disposed in fluid communication with the downhole wellbore fluid passage for receiving at least reservoir fluids from the downhole wellbore fluid passage; a first outlet port; a reservoir fluid-conducting passage extending between the first inlet port and the first outlet port; a second inlet port disposed downhole relative to the first outlet port; a second outlet port; a gas-depleted fluid conducting passage extending between the second inlet port and the second outlet port; and a co-operating surface portion co-operating with the separator co-operating fluid conductor to define an intermediate fluid passage therebetween for effecting fluid communication between the first outlet port and the second inlet port; wherein the separator is sealingly, or substantially sealingly, disposed relative to the separator co-operating fluid conductor to defined a sealed interface, and the sealing disposition is effected downhole relative to the second inlet port, with effect that fluid flow, across the sealed interface, is prevented, or substantially prevented; and wherein the space, between: (a) the second inlet port of the separator, and (b) the sealed interface, defines a sump for collection of solid particulate that is entrained within fluid being discharged from the first outlet port of the separator, and the space has a volume of at least 0.1 m$^3$.

In another aspect, there is provided a system for processing at least reservoir fluids within a wellbore that is disposed within an oil reservoir, the wellbore including a wellbore fluid conductor having a fluid passage, the wellbore fluid conductor comprising: a separator co-operating fluid conductor disposed within the wellbore, and including a downhole wellbore fluid passage for receiving reservoir fluids from the reservoir and for conducting at least reservoir fluids; a separator including: a first inlet port disposed in fluid communication with the downhole wellbore fluid passage for receiving at least reservoir fluids from the downhole wellbore fluid passage; a first outlet port; a reservoir fluid-conducting passage extending between the first inlet port and the first outlet port; a second inlet port disposed downhole relative to the first outlet port; a second outlet port; a gas-depleted fluid conducting passage extending between the second inlet port and the second outlet port; and a co-operating surface portion co-operating with the separator co-operating fluid conductor to define an intermediate fluid passage therebetween for effecting fluid communication between the first outlet port and the second inlet port; wherein the separator is sealingly, or substantially sealingly, disposed relative to the separator co-operating fluid conductor to defined a sealed interface, and the sealing disposition is effected downhole relative to the second inlet port, with effect that fluid flow, across the sealed interface, is prevented, or substantially prevented; and wherein the space, between: (a) the second inlet port of the separator, and (b) the sealed interface, defines a sump for collection of solid particulate that is entrained within fluid being discharged from the first outlet port of the separator, and the minimum separation distance between: (a) the second inlet port of the separator, and (b) the sealed interface, measured along a line parallel to the axis of the fluid passage of the wellbore fluid conductor, is at least 30 feet.

In another aspect, there is provided a separator for effecting separation of materials from reservoir fluid within a wellbore fluid conductor disposed within a wellbore, the wellbore fluid conductor including a separator co-operating fluid conductor, the separator co-operating fluid conductor including a downhole wellbore fluid passage for receiving reservoir fluids from the reservoir and for conducting at least reservoir fluids, wherein the separator comprises: a first inlet port for receiving at least reservoir fluids from the downhole wellbore fluid passage; a first outlet port; a reservoir fluid-conducting passage extending between the first inlet port and the first outlet port; a second inlet port, positioned relative to the first outlet port such that, when the separator is disposed within the wellbore and oriented for receiving at least reservoir fluids via the first inlet port, the second inlet portion is disposed downhole relative to the first outlet port; a second outlet port; a gas-depleted fluid conducting passage extending between the second inlet port and the second outlet port; a co-operating surface portion configured for co-operating with the separator co-operating fluid conductor, when the separator is disposed within the wellbore and oriented for receiving at least reservoir fluids via the first inlet port, to define an intermediate fluid passage therebetween for effecting fluid communication between the first outlet port and the second inlet port; a seal support portion having an outer surface; and a sealing member supported by the seal support portion, the sealing member being configured for sealingly, or substantially sealingly, engaging the separator co-operating fluid conductor, and positioned relative to the second inlet port such that, when the separator is disposed within the wellbore and oriented for receiving at least reservoir fluids via the first inlet port, the sealing member is disposed downhole relative to the second inlet port and in sealing, or substantially sealing, engagement with the separator co-operating fluid conductor; wherein the sealing member projects outwardly from the outer surface by a distance of less than 2.5 millimetres.

In another aspect, there is provided a separator for separating material from at least reservoir fluid received from a fluid conductor of a wellbore in an oil reservoir, the separator comprising: an inlet port for receiving reservoir fluid from the fluid conductor and an outlet port for delivering gas-depleted reservoir fluid; a seal support member having an outer surface; and a sealing member supported by the seal support member, the sealing member being configured to sealingly, or substantially sealingly, engage the inlet port with the fluid conductor and prevent, or substantially prevent, the reservoir fluid from bypassing the inlet port, the sealing member projecting outwardly, from the outer surface by a distance of less than 2.5 mm.

In another aspect, there is provided a separator for effecting separation of materials from reservoir fluid within a wellbore fluid conductor disposed within a wellbore, the wellbore fluid conductor including a separator co-operating fluid conductor, the separator co-operating fluid conductor including a downhole wellbore fluid passage for receiving reservoir fluids from the reservoir and for conducting at least reservoir fluids, wherein the separator comprises: a first inlet port for receiving at least reservoir fluids from the downhole wellbore fluid passage; a first outlet port; a reservoir fluid-conducting passage extending between the first inlet port and the first outlet port; a second inlet port, positioned relative to the first outlet port such that, when the separator is disposed within the wellbore and oriented for receiving at least reservoir fluids via the first inlet port, the second inlet portion is disposed downhole relative to the first outlet port; a second outlet port; a gas-depleted fluid conducting passage extending between the second inlet port and the second outlet port; a co-operating surface portion configured for co-operating with the separator co-operating fluid conductor, while the separator is disposed within the wellbore and oriented for receiving at least reservoir fluids via the first inlet port, to define an intermediate fluid passage therebetween for effecting fluid communication between the first outlet port and the second inlet port; a seal support portion; a sealing member supported by the seal support portion, the sealing member being configured for sealingly, or substantially sealingly, engaging the separator co-operating fluid conductor, and positioned relative to the second inlet port such that, when the separator is disposed within the wellbore and oriented for receiving at least reservoir fluids via the first inlet port, the sealing member is disposed downhole relative to the second inlet port and in sealing, or substantially sealing, engagement with the separator co-operating fluid conductor; wherein, the sealing member is further configured such that, when the separator is disposed within the wellbore and oriented for receiving at least reservoir fluids via the first inlet port, and the sealing member is sealingly, or substantially sealingly, engaged to the separator co-operating fluid conductor, the sealing member, including an exposed surface portion, that is disposed in fluid communication with the intermediate fluid passage, is extending across a gap, between the separator and the separator co-operating fluid conductor, having a minimum distance of less than 2.5 millimetres.

In another aspect, there is provided a separator for effecting separation of materials from reservoir fluid within a wellbore fluid conductor disposed within a wellbore, the wellbore fluid conductor including a separator co-operating fluid conductor and a liner, the separator co-operating fluid conductor including a downhole wellbore fluid passage for receiving reservoir fluids from the reservoir and for conducting at least reservoir fluids, the liner being coupled to and disposed in sealing, or substantially sealing, engagement with the separator co-operating fluid conductor, and including a liner fluid passage, such that the downhole wellbore fluid passage includes the liner fluid passage, wherein the separator comprises: a first inlet port for receiving at least reservoir fluids from the downhole wellbore fluid passage; a first outlet port; a reservoir fluid-conducting passage extending between the first inlet port and the first outlet port; a second inlet port, positioned relative to the first outlet port such that, when the separator is disposed within the wellbore and oriented for receiving at least reservoir fluids via the first inlet port, the second inlet portion is disposed downhole relative to the first outlet port; a second outlet port; a gas-depleted fluid conducting passage extending between the second inlet port and the second outlet port; a co-operating surface portion configured for co-operating with the separator co-operating fluid conductor, while the separator is disposed within the wellbore and oriented for receiving at least reservoir fluids via the first inlet port, to define an intermediate fluid passage therebetween for effecting fluid communication between the first outlet port and the second inlet port; a sealing member configured for sealingly, or substantially sealingly, engaging the liner, and positioned relative to the second inlet port such that, when the separator is disposed within the wellbore and oriented for receiving at least reservoir fluids via the first inlet port, the sealing member is disposed downhole relative to the second inlet port and in sealing, or substantially sealing, engagement with the liner; and a latch seal assembly, carrying the sealing member, and co-operatively configured for releasable connection to the liner.

BRIEF DESCRIPTION OF DRAWINGS

The process of the preferred embodiments of the invention will now be described with the following accompanying drawing.

DETAILED DESCRIPTION

Figure 1:
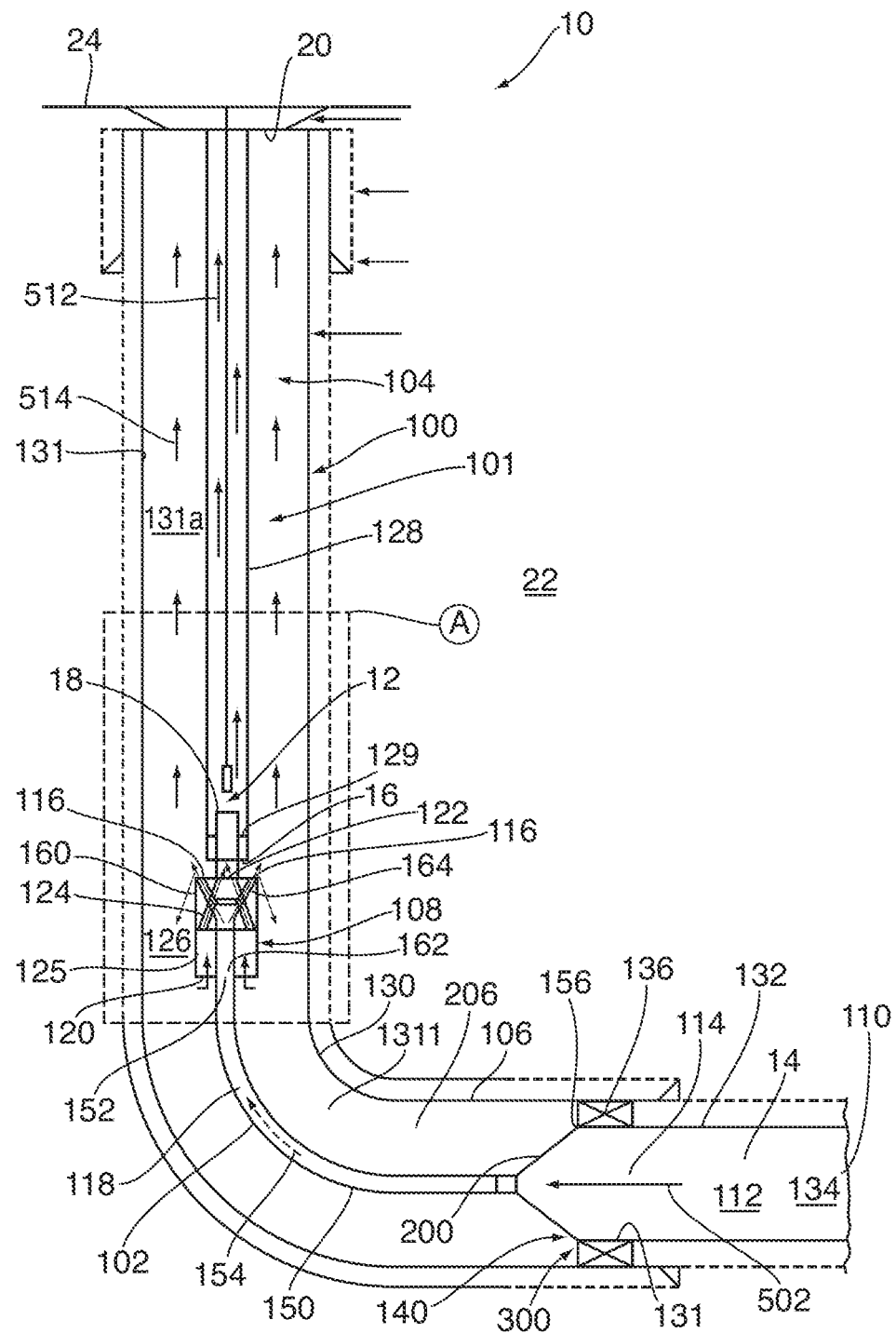
FIG. 1 is a schematic illustration of an embodiment of a system of the present disclosure using a downhole pump.

As used herein, the terms "up", "upward", "upper", or "uphole", mean, relativistically, in closer proximity to the surface and further away from the bottom of the wellbore, when measured along the longitudinal axis of the wellbore. The terms "down", "downward", "lower", or "downhole" mean, relativistically, further away from the surface and in closer proximity to the bottom of the wellbore, when measured along the longitudinal axis of the wellbore.

There is provided systems, with associated apparatuses, for producing hydrocarbons from an oil reservoir, such as an oil reservoir, when reservoir pressure within the oil reservoir is insufficient to conduct hydrocarbons to the surface through a wellbore.

The wellbore can be straight, curved, or branched. The wellbore can have various wellbore portions. A wellbore portion is an axial length of a wellbore. A wellbore portion can be characterized as "vertical" or "horizontal" even though the actual axial orientation can vary from true vertical or true horizontal, and even though the axial path can tend to "corkscrew" or otherwise vary. The term "horizontal", when used to describe a wellbore portion, refers to a horizontal or highly deviated wellbore portion as understood in the art, such as, for example, a wellbore portion having a longitudinal axis that is between 70 and 110 degrees from vertical.

The wellbore may be completed either as a cased-hole completion or an open-hole completion.

Well completion is the process of preparing the well for injection of fluids into the oil reservoir, or for production of reservoir fluid from the oil reservoir. This may involve the provision of a variety of components and systems to facilitate the injection and/or production of fluids, including components or systems to segregate oil reservoir zones along sections of the wellbore.

"Reservoir fluid" is fluid that is contained within an oil reservoir. Reservoir fluid may be liquid material, gaseous material, or a mixture of liquid material and gaseous material. In some embodiments, for example, the reservoir fluid includes water and hydrocarbons, such as oil, natural gas, or combinations thereof.

Fluids may be injected into the oil reservoir through the wellbore to effect stimulation of the reservoir fluid. For example, such fluid injection is effected during hydraulic fracturing, water flooding, water disposal, gas floods, gas disposal (including carbon dioxide sequestration), steam-assisted gravity drainage ("SAGD") or cyclic steam stimulation ("CSS"). In some embodiments, for example, the same wellbore is utilized for both stimulation and production operations, such as for hydraulically fractured formations or for formations subjected to CSS. In some embodiments, for example, different wellbores are used, such as for formations subjected to SAGD, or formations subjected to waterflooding.

A cased-hole completion involves running wellbore casing down into the wellbore through the production zone. The wellbore casing at least contributes to the stabilization of the oil reservoir after the wellbore has been completed, by at least contributing to the prevention of the collapse of the oil reservoir within which the wellbore is defined.

The annular region between the deployed wellbore casing and the oil reservoir may be filled with cement for effecting zonal isolation (see below). The cement is disposed between the wellbore casing and the oil reservoir for the purpose of effecting isolation, or substantial isolation, of one or more zones of the oil reservoir from fluids disposed in another zone of the oil reservoir. Such fluids include reservoir fluid being produced from another zone of the oil reservoir (in some embodiments, for example, such reservoir fluid being flowed through a production tubing string disposed within and extending through the wellbore casing to the surface), or injected fluids such as water, gas (including carbon dioxide), or stimulations fluids such as fracturing fluid or acid. In this respect, in some embodiments, for example, the cement is provided for effecting sealing, or substantial sealing, of fluid communication between one or more zones of the oil reservoir and one or more others zones of the oil reservoir (for example, such as a zone that is being produced). By effecting the sealing, or substantial sealing, of such fluid communication, isolation, or substantial isolation, of one or more zones of the oil reservoir, from another subterranean zone (such as a producing formation), is achieved. Such isolation or substantial isolation is desirable, for example, for mitigating contamination of a water table within the oil reservoir by the reservoir fluid (e.g. oil, gas, salt water, or combinations thereof) being produced, or the above-described injected fluids.

In some embodiments, for example, the cement is disposed as a sheath within an annular region between the wellbore casing and the oil reservoir. In some embodiments, for example, the cement is bonded to both of the production casing and the oil reservoir.

In some embodiments, for example, the cement also provides one or more of the following functions: (a) strengthens and reinforces the structural integrity of the wellbore, (b) prevents, or substantially prevents, produced reservoir fluid of one zone from being diluted by water from other zones. (c) mitigates corrosion of the wellbore casing, and (d) at least contributes to the support of the wellbore casing.

The cement is introduced to an annular region between the wellbore casing and the oil reservoir after the subject wellbore casing has been run into the wellbore. This operation is known as "cementing".

In some embodiments, for example, the wellbore casing includes one or more casing strings, each of which is positioned within the well bore, having one end extending from the well head. In some embodiments, for example, each casing string is defined by jointed segments of pipe. The jointed segments of pipe typically have threaded connections.

Typically, a wellbore contains multiple intervals of concentric casing strings, successively deployed within the previously run casing. With the exception of a liner string, casing strings typically run back up to the surface.

For wells that are used for producing reservoir fluid, few of these actually produce through wellbore casing. This is because producing fluids can corrode steel or form undesirable deposits (for example, scales, asphaltenes or paraffin waxes) and the larger diameter can make flow unstable. In this respect, a production tubing string is usually installed inside the last casing string. The production tubing string is provided to conduct reservoir fluid, received within the wellbore, to the wellhead. In some embodiments, for example, the annular region between the last casing string and the production tubing string may be sealed at the bottom by a packer.

To facilitate fluid communication between the reservoir and the wellbore, the wellbore casing may be perforated, or otherwise include per-existing ports, to provide a fluid passage for enabling flow of reservoir fluid from the reservoir to the wellbore.

In some embodiments, for example, the wellbore casing is set short of total depth. Hanging off from the bottom of the wellbore casing, with a liner hanger or packer, is a liner string. The liner string can be made from the same material as the casing string, but, unlike the casing string, the liner string does not extend back to the wellhead. Cement may be provided within the annular region between the liner string and the oil reservoir for effecting zonal isolation (see below), but is not in all cases. In some embodiments, for example, this liner is perforated to effect fluid communication between the reservoir and the wellbore. In this respect, in some embodiments, for example, the liner string can also be a screen or is slotted. In some embodiments, for example, the production tubing string may be stung into the liner string, thereby providing a fluid passage for conducting the produced reservoir fluid to the wellhead. In some embodiments, for example, no cemented liner is installed, and this is called an open hole completion.

An open-hole completion is effected by drilling down to the top of the producing formation, and then casing the wellbore. The wellbore is then drilled through the producing formation, and the bottom of the wellbore is left open (i.e. uncased), to effect fluid communication between the reservoir and the wellbore. Open-hole completion techniques include bare foot completions, pre-drilled and pre-slotted liners, and open-hole sand control techniques such as stand-alone screens, open hole gravel packs and open hole expandable screens. Packers can segment the open hole into separate intervals.

Referring to FIGS. 1, 3, 8 and 10, the system 10 includes an artificial lift system 12 a wellbore fluid conductor 100. The artificial lift system 12 is provided to contribute to the production of reservoir fluids from the reservoir 22. Suitable exemplary artificial lift systems include a pump, gas-lift systems, and jet lift systems. A pump 12 is described herein, but it is understood that other artificial lift systems could be used.

The pump 12 is provided to, through mechanical action, energize and effect movement of the reservoir fluid from the reservoir 22, through the wellbore 14, and to the surface 24, and thereby effect production of the reservoir fluid. The wellbore fluid conductor 100 includes a fluid passage 101, and is provided for conducting, through the wellbore 14, fluids being energized and moved by at least the pump 12. It is understood that the reservoir fluid may be energized by other means, including by gas-lift, as will be further discussed below with respect to some embodiments. In this respect, in some implementations using gas-lift to effect production of the reservoir fluid, in addition to the reservoir fluid, the fluid being conducted by through the fluid passage 101 of the wellbore fluid conductor 100, and also being energized and moved by the pump 12, includes gaseous material supplied from the surface and into the wellbore 14, for effecting gas-lift of the reservoir fluid.

The wellbore fluid conductor 100 includes an upstream fluid conductor 102. The upstream fluid 102 conductor receives at least reservoir fluid from the wellbore 14, and conducts the received fluid within the wellbore 14. The upstream fluid conductor 102 is disposed in fluid communication with the pump suction 16 such that at least a fraction of the received fluid being conducted by the upstream fluid conductor 102 is supplied the pump suction. In some embodiments, for example, the wellbore fluid conductor 100 includes wellbore casing 130.

The wellbore fluid conductor 100 also includes a downstream fluid conductor 104, for conducting fluid, that is being discharged by the pump 12 through the pump discharge 18, to the surface, or gaseous material that has been separated by a separator 108 (see below). In some embodiments, for example, the downstream fluid conductor 104 includes a piping or tubing string that extends from the pump discharge 18 to the wellhead 20.

The upstream fluid conductor 102 includes a separator co-operating fluid conductor 106, disposed within the wellbore 14, and a separator 108. The separator co-operating fluid conductor 106 co-operates with the separator 108 to effect separation of at least a fraction of gaseous material from reservoir fluid being conducted through the upstream fluid conductor 102, prior to its introduction to the pump suction 16, as described below. In some embodiments, for example, the wellbore fluid conductor 100 includes wellbore casing 130, and the wellbore casing 130 includes the separator co-operating fluid conductor 106.

The separator co-operating fluid conductor 106 includes an inlet port 110 for receiving reservoir fluids from the reservoir 20, and a downhole wellbore fluid passage 112 for effecting conducting (e.g. flowing) of the received fluid, including reservoir fluid, to the separator 108. In co-operation with the separator co-operating fluid conductor 106, the separator 108 functions to effect depletion of gaseous material from the fluid being supplied by the downhole wellbore fluid passage 112, such that a fluid, depleted in gaseous material, is supplied to the pump suction.

Reservoir fluid may contain gaseous material. As well, in some embodiments, the system 10 may include a gas lift component, in which case suitable infrastructure is provided so as to supply gaseous material for admixing with reservoir fluid received within the wellbore 14 so as to effect a density reduction in the fluid disposed within the wellbore 14 for conduction (such as by flowing) to the pump suction 16 (such density reduction effects a reduction in pressure of the fluid within the wellbore 14, increases drawdown, and thereby facilitates an increased rate of production of reservoir fluid from the reservoir 22).

In either case, it is preferable to at least partially remove gaseous material from the fluid being conducted within the upstream fluid conductor 102, prior to the pump suction 16, in order to mitigate gas interference or gas lock conditions during pump operation. The separator 108, in co-operation with the separator co-operating fluid conductor 106, is provided to, amongst other things, perform this function.

The separator 108 includes a first inlet port 114 and a first outlet port 116. The first inlet port 114 is disposed in fluid communication with the downhole wellbore fluid passage 112 for receiving at least reservoir fluids (see directional arrow 502) from the downhole wellbore fluid passage 112. A reservoir fluid-conducting passage 118 extends between the first inlet port 114 and the first outlet port 116.

The separator 108 also includes a second inlet port 120 and a second outlet port 122. The second inlet port 120 is disposed downhole relative to the first outlet port 116. A gas-depleted fluid conducting passage 124 extends between the second inlet port 120 and the second outlet port 122.

In some embodiments, for example, the first inlet port 114 of the separator 108 is disposed downhole relative to the second outlet port 122 of the separator 108.

The separator 108 further includes a co-operating surface portion 125. The co-operating surface portion 125 co-operates with the separator co-operating fluid conductor 106 to define an intermediate fluid passage 126 (such as an annular fluid passage) therebetween for effecting fluid communication between the first outlet port 116 and the second inlet port 120. While at least reservoir fluid is flowing within the intermediate fluid passage 126 (see directional arrow 504), at least a fraction of gaseous material, within the downwardly flowing fluid within the intermediate fluid passage 126, is separated from the downwardly flowing fluid in response to buoyancy forces, to produce a gaseous material-depleted fluid. The separated gaseous material is conducted uphole to the wellhead 20 through a conductor 131 that is disposed in fluid communication with the intermediate fluid passage 126. In some embodiments, for example, the conductor 131 defines a gas conducting passage 131*a* disposed between the wellbore fluid conductor 100 (such as a wellbore casing) and a pressurized fluid conductor 128 that is extending uphole from a pump discharge 18 (see below). The gaseous material-depleted fluid is conducted (see directional arrow 506) to the pump suction 16 via the gas-depleted fluid conducting passage 124.

The separator 108 is sealingly, or substantially sealingly, disposed relative to the separator co-operating fluid conductor 106. The sealing, or substantially sealing, disposition is effected downhole relative to the second inlet port 120. The sealing disposition is such that a sealing interface 300 is defined, and such that fluid flow, across the sealed interface 300, is prevented, or substantially prevented. In some embodiments, for example, the sealing, or substantially sealing, disposition of the separator 108 relative to the separator co-operating fluid conductor 106 is with effect that fluid flow, across the sealed interface 300, in at least a downhole direction, is prevented, or substantially prevented. In some embodiments, for example, the sealing, or substantially sealing, disposition of the separator 108 relative to the separator co-operating fluid conductor 106 is with effect that fluid, that is being conducted in a downhole direction within the intermediate fluid passage 126, is directed to the second inlet port 120. In this respect, the gaseous material-depleted fluid, produced after the separation of gaseous material within the intermediate fluid passage 126, is directed to the second inlet port 122 (see directional arrow 508), and conducted to the pump suction 16 (see directional arrow 506) via the gas-depleted fluid conducting passage 124.

Referring to FIG. 1, in some embodiments, for example, the wellbore fluid conductor 100 may also include a liner 132 that is connected or coupled to (for example, hung from), and sealed, or substantially sealed, relative to, the separator co-operating fluid conductor 106. The liner 132 includes a liner fluid passage 134, such that the downhole wellbore fluid passage 112 includes the liner fluid passage 132. In some embodiments, for example, the sealed, or substantially sealed, disposition of the liner 132 relative to the separator co-operating fluid conductor 108 is effected by a packer 136 disposed between the liner 132 and the wellbore casing 130. In some embodiments, for example, the coupling and sealing, or substantially sealing, engagement between the liner 132 and the separator co-operating fluid conductor, includes coupling and sealing, or substantially sealing, engagement between the liner 132 and the wellbore casing 130.

Figure 8:
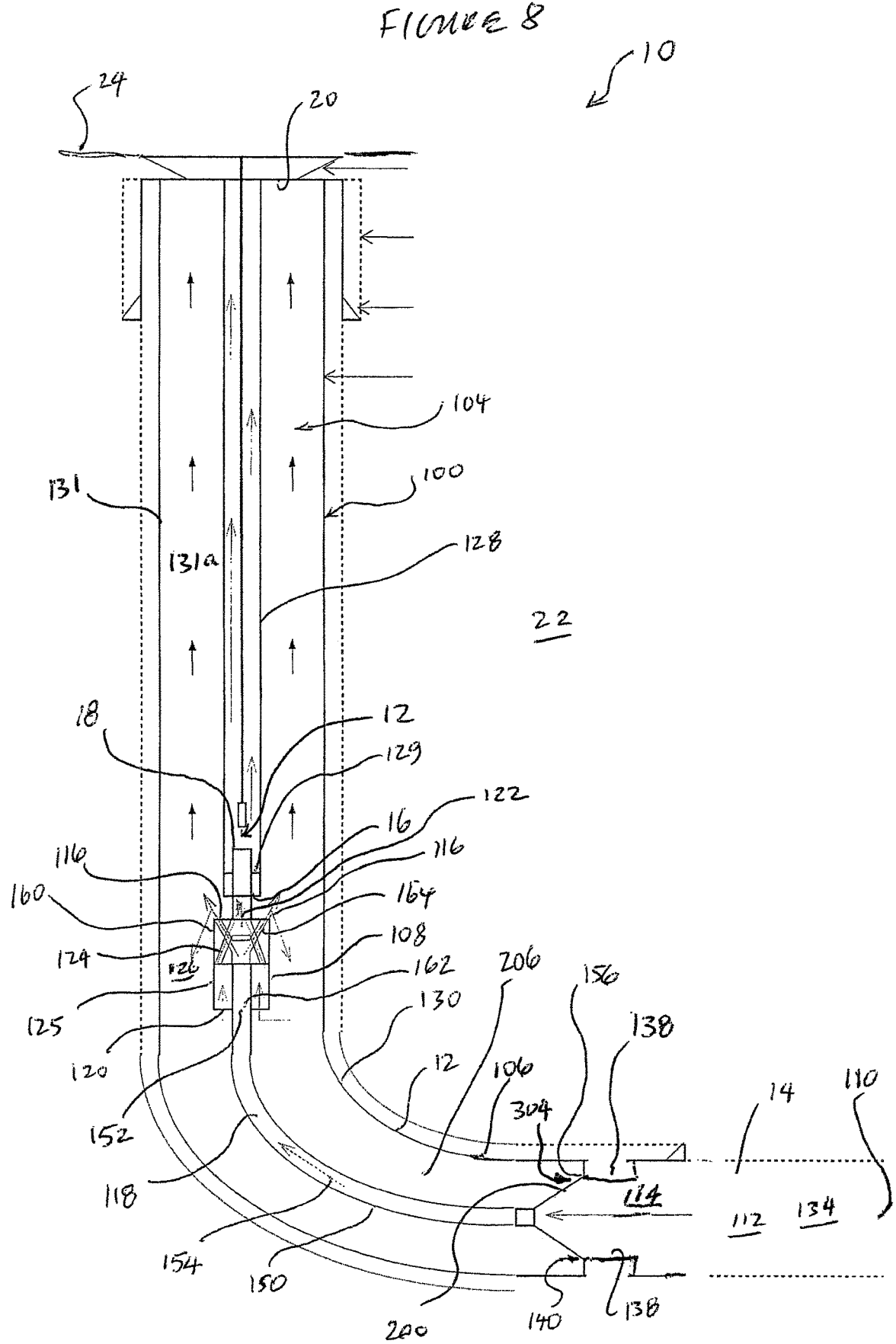
FIG. 8 is a schematic illustration of another embodiment of a system of the present disclosure using a downhole pump.

Referring to FIG. 8, in some embodiments, for example, the separator co-operating fluid conductor 106 includes a constricted portion 138 of wellbore casing 130.

In some embodiments, for example, the separator 108 includes, or carries, a sealing member 202 for effecting the sealing, or substantially sealing, disposition of the separator 108 relative to the separator co-operating fluid conductor 106. In some embodiments, for example, the sealing member 202 is a compressible sealing member. In some embodiments, for example, the sealing member 202 includes one or more o-rings.

In some embodiments, for example, the wellbore casing 130 includes a casing fluid passage 1311, and the liner fluid passage 132 is disposed downhole from the casing fluid passage 1311. In some embodiments, for example, the separator 108 is disposed within the casing fluid passage 1311.

In some embodiments, for example, the separator 108 includes a downhole fluid conductor 150 and a flow diverter 160.

The downhole fluid conductor 150 includes the first inlet port 114, a first intermediate outlet port 152, and a downhole reservoir fluid-conducting passage 154. The downhole reservoir fluid-conducting passage 154 extends between the first inlet port 114 and the intermediate outlet port 152. In some embodiments, for example, the downhole fluid conductor 150 also includes a separator sealing surface 156, such as a separator sealing surface defined by the sealing member 140. In some embodiments, for example, the downhole fluid conductor 150 includes a piping or tubing string.

In some embodiments, for example, the downhole fluid conductor 150 includes, or carries, the sealing member 202. In some embodiments, for example, the downhole fluid conductor 150 is configured such that received fluid (including reservoir fluids) is conducted through the downhole fluid conductor 150, and the conducting of the received fluid is such that the superficial gas velocity of gaseous material, of the received fluid, being conducted through the downhole fluid conductor 150, is greater than five (5) feet per second.

The flow diverter 160 includes a first intermediate inlet port 162, the first outlet port 116, and an uphole reservoir fluid-conducting passage 164. The uphole reservoir fluid-conducting passage 164 extends between the intermediate inlet port and the first outlet port 116.

The flow diverter 160 also includes the second inlet port 120, the second outlet port 122, and the gas-depleted fluid conducting passage 124. The gas-depleted fluid conducting passage 124 extends between the second inlet port 120 and the second outlet port 122.

The flow diverter 160 also includes the co-operating surface portion 125.

An embodiment of a flow diverter 160 is illustrated in FIGS. 3 to 7. Referring to FIGS. 3 to 7, in some embodiments, for example, the flow diverter 160 includes a plurality of first outlet ports 116a, 116b, 116c, 116d and the uphole reservoir fluid-conducting passage 164 includes a plurality of branched fluid passage portions 164a, 164b, 164c, 164d (two are shown) that extend into corresponding first outlet ports 116a, 116b, 116c, 116d, for effecting fluid coupling with the first intermediate inlet port 162. The flow diverter 160 further includes a plurality of second inlet ports 120a, 120b, 120c, 120d, and the gas-depleted fluid conducting passage 124 includes a plurality of branched fluid passage portions 124a, 124b, 124c, 124d (two are shown) extending from the second inlet ports 120a, 120b, 120c, 120d for effecting fluid coupling with the second outlet port 122. In some embodiments, for example, the fluid diverter 160 includes a shroud (or "skirt") 161 extending downwardly below the second inlet ports 120a, 120b, 120c, 120d. This provides increased residence time for separation of gaseous material within the intermediate fluid passage 126.

The combination of the downhole fluid conductor 150 and the flow diverter 160 is such that the reservoir fluid-conducting passage 118 includes the downhole reservoir fluid-conducting passage 154 and the uphole reservoir fluid-conducting passage 164.

The downhole fluid conductor 150 is connected to the flow diverter 100 such that the intermediate outlet port 152 of the downhole fluid conductor 150 is disposed in fluid communication with the intermediate inlet port 162 of the flow diverter 160, thereby effecting supplying of fluid from the intermediate outlet port 152 to the intermediate inlet port 162. In some embodiments, for example, the downhole reservoir fluid conductor 150 is threadably connected to the flow diverter 160.

In some embodiments, for example, the axis of the second outlet port 122 of the flow diverter 160 is disposed in alignment, or substantial alignment, with the axis of the downhole reservoir fluid-conducting passage 154 of the downhole fluid conductor 150.

The separator 108 is connected to the pump 12 such that the second outlet port 122 is fluidly coupled to the pump suction 16 for supplying gaseous material-depleted fluid to the pump suction 16. In some embodiments, for example, the connection is a threaded connection.

The pump 12 functions to effect transport of at least reservoir fluid from the reservoir 22 to the surface 24. In some embodiments, for example, the pump 12 is a sucker rod pump. Other suitable pumps include screw pumps, electrical submersible pumps, and jet pumps.

The pressurized fluid conductor 128 is connected to the pump discharge 18 such that an inlet port 129 of the pressurized fluid conductor 128 is fluidly coupled to the pump discharge 18 for receiving pressurized gaseous material-depleted fluid being discharged by the pump 12. The pressurized fluid conductor 128 extends to the surface 24 via the wellhead 20, to thereby effect transport of the gaseous material-depleted fluid to the surface 24 (see directional arrow 512). The pressurized fluid conductor 128 is hung from the wellhead.

The reservoir fluid produced through the pressurized fluid conductor 128 may be discharged through the wellhead 20 to a collection facility, such as a storage tank within a battery.

Figure 10:
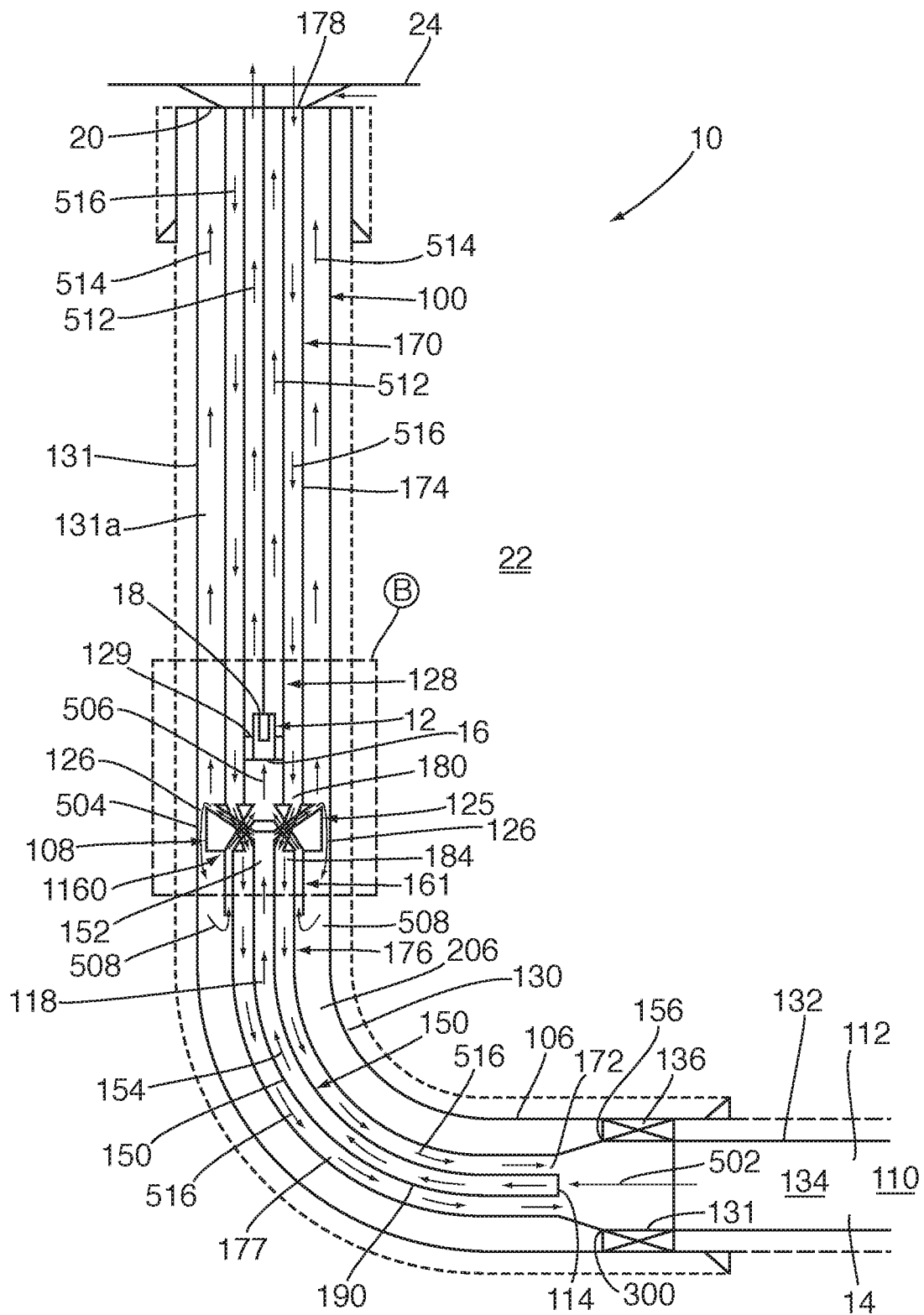
FIG. 10 is a schematic illustration of an embodiment of an artificial lift system of the present disclosure using a downhole pump and gas lift.

Referring to FIG. 10, in some embodiments, and as alluded to above, the wellbore fluid conductor 100, for example, is further configured to assist with production of reservoir fluids from the reservoir 22 by providing infrastructure to enable gas lift of the reservoir fluid received within the wellbore 14 from the reservoir. In this respect, in some embodiments, for example, the wellbore fluid conductor 100, includes a gaseous fluid conductor 170 for conducting gaseous material (see directional arrow 514) being supplied from a gaseous material source. The gaseous fluid conductor 170 extends from the surface 124 and into the wellbore 14. In some embodiments, for example, the gaseous fluid conductor 170 includes a piping or tubing string. In some of these embodiments, the piping or tubing string extends from the wellhead 20 and into the wellbore 14.

The gaseous fluid conductor 170 includes an outlet port 172 disposed in fluid communication with the inlet port 114 of the separator 108, for effecting admixing of gaseous material with reservoir fluid to produce a density-reduced fluid that includes the reservoir fluid. The admixing is effected upstream of the inlet port 114, such that the inlet port 114 is disposed for receiving the density-reduced fluid. In this respect, the "at least reservoir fluid" includes the gaseous material that has been supplied from the surface.

Figure 11:
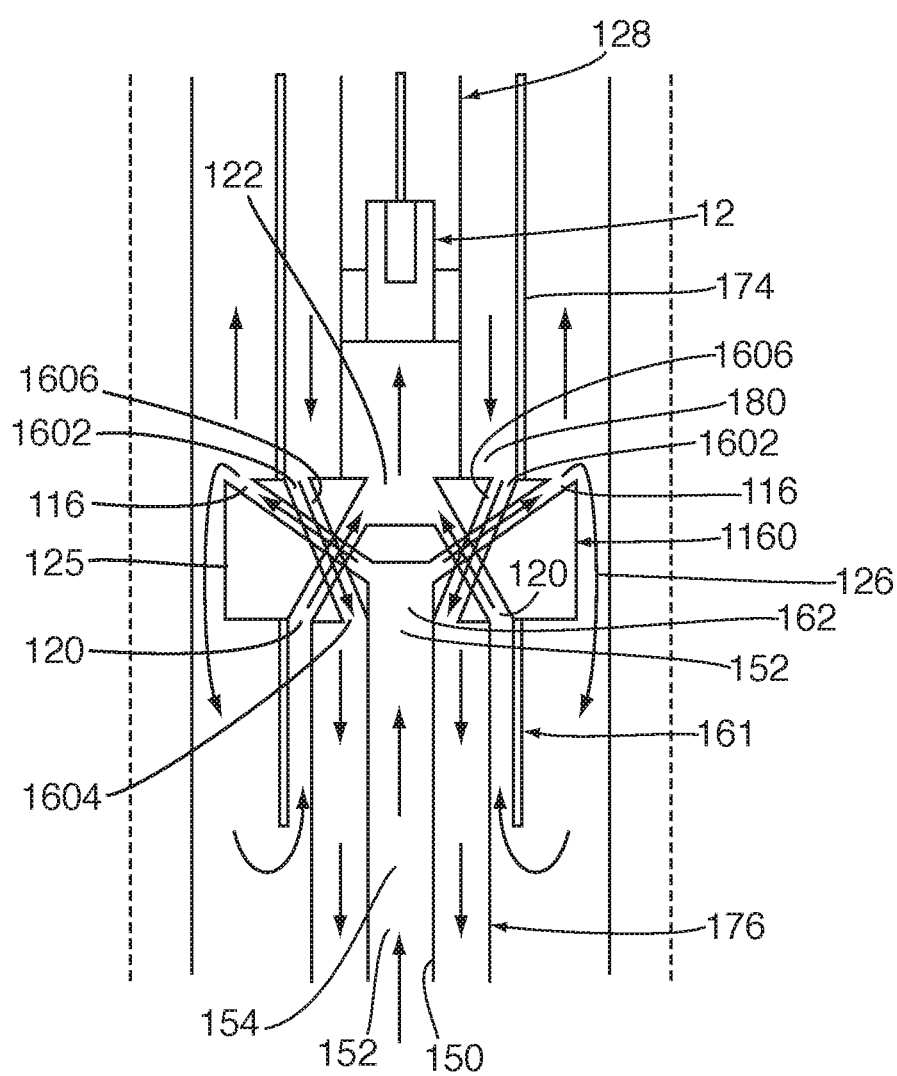
FIG. 11 is an enlarged view of Detail "B" in FIG. 10, illustrating the flow diverter.
Figure 12:
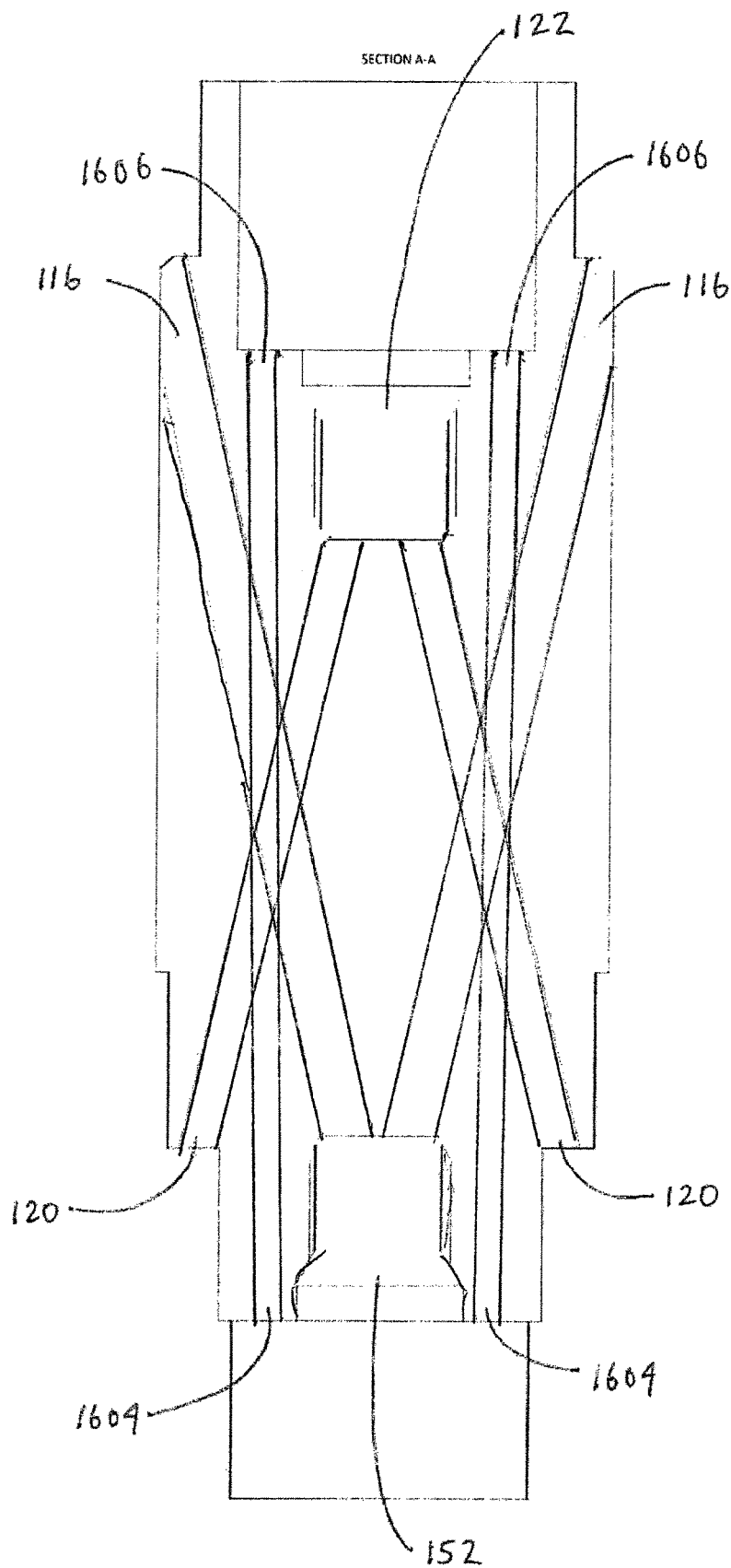
FIG. 12 is a schematic illustration of a flow diverter of the embodiment illustrated in FIG. 10.
Figure 13:
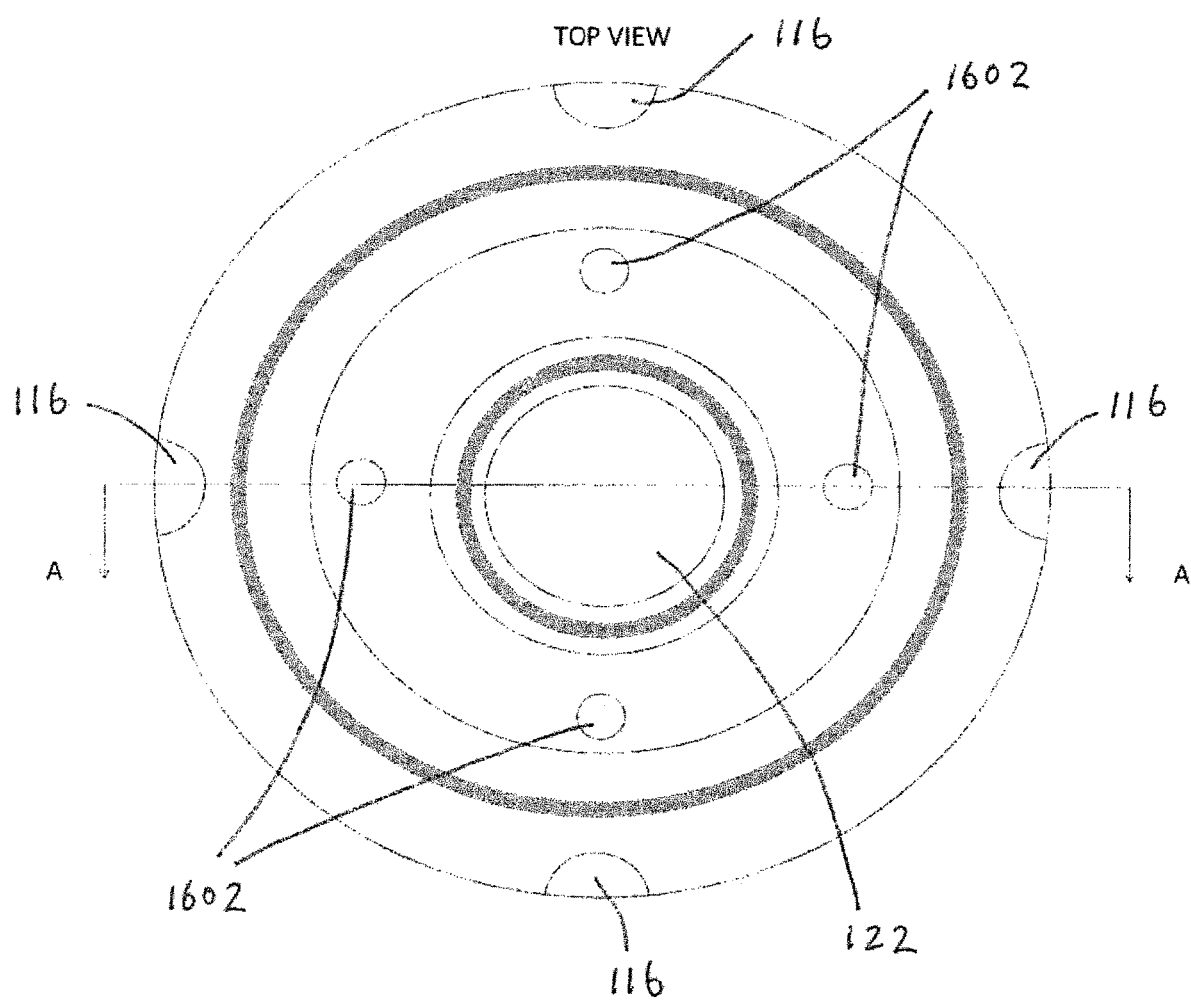
FIG. 13 is a top plan view of the flow diverter illustrated in FIG. 12.
Figure 14:
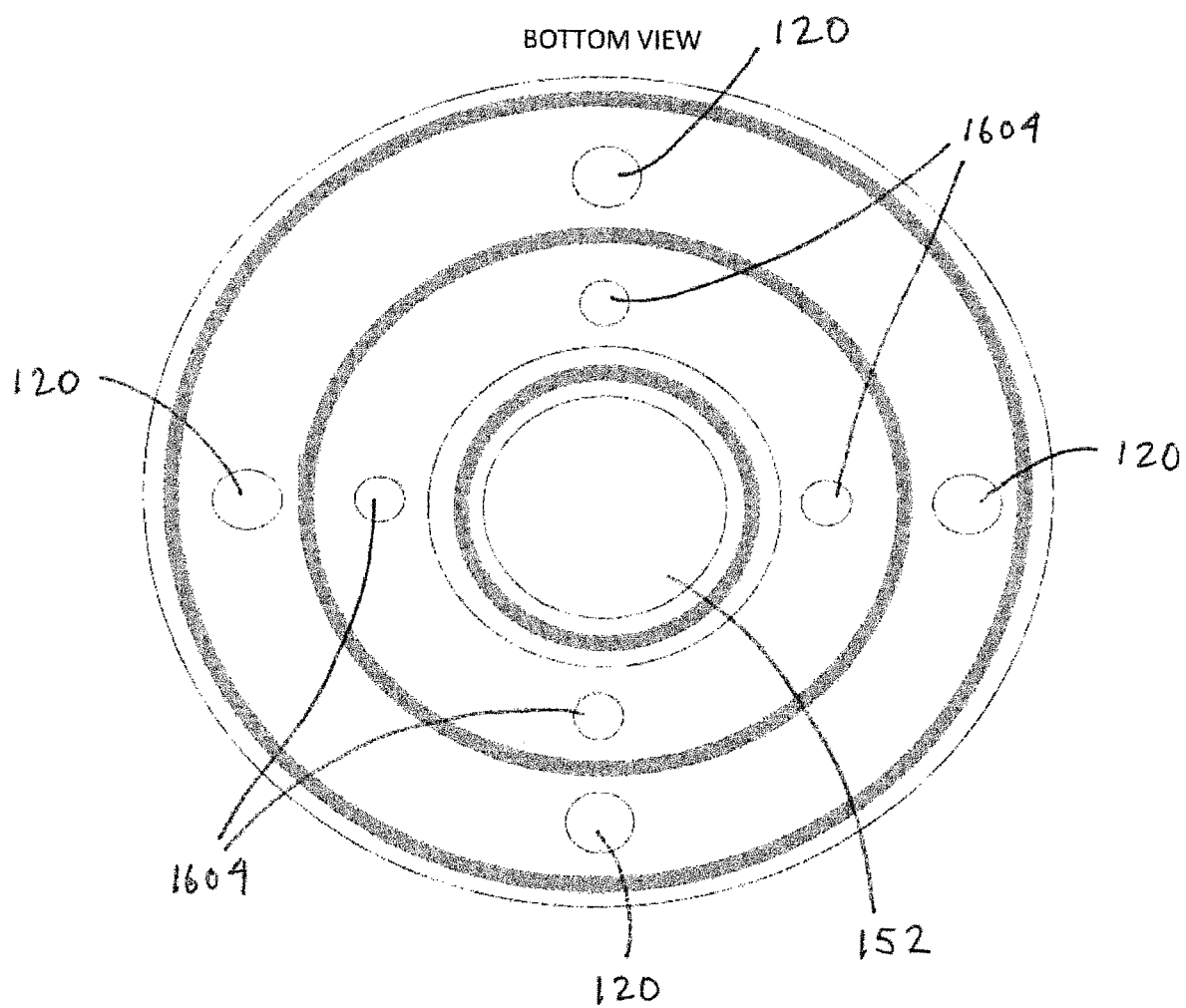
FIG. 14 is a bottom plan view of the flow diverter illustrated in FIG. 12.

Referring to FIG. 11, in some embodiments, for example, where the separator 108 includes a flow diverter 1160 (see FIGS. 12, 13, and 14), in some of these embodiments, for example, the gaseous fluid conductor 170 includes an uphole gaseous fluid conductor 174, including an uphole gas conducting passage 175, and a downhole gaseous fluid conductor 176.

The uphole gaseous fluid conductor 174 extends between the surface 24 and the flow diverter 1160. In this respect, in some embodiments, for example, the uphole gaseous fluid conductor 174 is connected to the wellhead 20 and extends from the wellhead 20, and is disposed in fluid communication with a gaseous material supply source, disposed at the surface 24, via the wellhead 20 and through an inlet port 178 of the uphole gaseous fluid conductor 174, for receiving gaseous material from the gaseous material supply source and conducting the received gaseous material to the flow diverter 1160. In some embodiments, for example, the uphole gaseous fluid conductor 174 is connected to the flow diverter 1160 such that an outlet port 180 of the uphole gaseous fluid conductor 174 is fluidly coupled to an inlet port 1602 of the flow diverter 160 for supplying the conducted gaseous material to the inlet port 1602 of the flow diverter 1160.

The downhole gaseous fluid conductor 176 extends downhole from the flow diverter 1160 to a position whereby the outlet port 172 of the downhole gaseous fluid conductor 176 is disposed for supplying the conducted gaseous material for admixing with reservoir fluid to produce a density-reduced fluid, upstream of the inlet port 114 of the downhole reservoir fluid conductor 150, such that the density-received fluid is disposed in fluid communication with the inlet port 114 of the downhole fluid conductor 150 for receiving by the inlet port 114 of the downhole fluid conductor 1160. In this respect, the downhole gaseous fluid conductor 176 is connected to the flow diverter 160 such that fluid communication between an outlet port 1604 of the flow diverter 1160 and an inlet port 184 of the downhole gaseous fluid conductor 176 is effected. Between the inlet 1602 and outlet ports 1604 of the flow diverter 160 extends a gas-conducting passage 1606 which fluidly couples the inlet and outlet ports 1602, 1604, such that the fluid coupling of the outlet port 1604 of the flow diverter 1160 and the inlet port 184 of the downhole gaseous fluid conductor 176 effects supplying of the gaseous material, being conducted through the uphole gaseous fluid conductor 174, to the downhole gaseous fluid conductor 176. In this respect, the flow diverter 1160 effects fluid coupling between the uphole and downhole gaseous fluid conductors 174,176.

In some embodiments, for example, the downhole gas conducting passage 177 is disposed within the downhole fluid conductor 150, along with the downhole reservoir fluid-conducting passage 154. In this respect, the downhole fluid conductor 150 includes the downhole gas conducting passage 177 and the downhole reservoir fluid-conducting passage 154. In some of these embodiments, for example, the downhole fluid conductor 150 includes the downhole gaseous fluid conductor 176, including the downhole gas conducting passage 177, and a downhole reservoir fluid conductor 190, including the downhole reservoir fluid-conducting passage 154, and the downhole reservoir fluid conductor 190 is nested within the downhole gaseous fluid conductor 176, such that the downhole gas conducting passage 177 is defined by an intermediate passage (such as an annulus) between the downhole gaseous fluid conductor 176 and the downhole reservoir fluid conductor 190.

Referring to FIG. 1, in one aspect, the liner 132 is connected or coupled to (for example, hung from), and is disposed in sealing, or substantially sealing, engagement with the separator co-operating fluid conductor 106, and the separator 108 is disposed in sealing, or substantially sealing, engagement with the liner 132. In this configuration, the first inlet port 114 is disposed for receiving at least reservoir fluid via the liner fluid passage 134.

In some embodiments, for example, the separator 108 further includes a latch seal assembly 200 releasably coupled to the liner 132, wherein the sealing, or substantially sealing, engagement between the liner 132 and the separator 108 is effected by the latch seal assembly 130. A suitable latch seal assembly 130 is a Weatherford™ Thread-Latch Anchor Seal Assembly.

In some embodiments, for example, the sealing, or substantially sealing, engagement includes sealing, or substantially sealing, engagement of the liner 132 to a separator sealing surface 156 of the separator 108, and the separator sealing surface 156 includes one or more o-rings.

In some embodiments, for example, the sealing, or substantially sealing, engagement includes sealing, or substantially sealing, engagement of the separator 108 to a polished bore receptacle 131 of the liner 132.

In some embodiments, for example, the separator 108 is disposed in an interference fit with the liner 132.

In some embodiments, for example, the separator 108 is landed or "stung" within the liner 132.

In some embodiments, for example, the combination of at least: (a) the sealing, or substantially sealing, engagement of the liner 132 with the wellbore casing 130, and (b) the sealing, or substantially sealing, engagement of the separator 108 with the liner 132, effects the sealing, or substantially sealing, disposition of the separator 108 (and, more specifically, the separator sealing surface 156) relative to the separator co-operating fluid conductor 106.

In some embodiments, for example, the combination of at least: (i) the sealing, or substantially sealing, engagement between the liner 132 and the separator co-operating fluid conductor 106, and (ii) the sealing, or substantially sealing, engagement between the separator sealing surface 156 and the liner 132, is such that the separator sealing surface 156 is sealed, or substantially sealed, relative to the separator co-operating fluid conductor 106 and thereby defines the sealed interface 301, such that fluid flow, across the sealed interface 301, is prevented or substantially prevented.

In some embodiments, for example, the combination of at least: (i) the sealing, or substantially sealing, engagement between the liner 132 and the separator co-operating fluid conductor 106, and (ii) the sealing, or substantially sealing, engagement between the separator sealing surface 156 and the liner 132, is with effect that fluid flow, across the sealed interface 301, in at least a downhole direction, is prevented or substantially prevented.

In some embodiments, for example, the combination of at least: (i) the sealing, or substantially sealing, engagement between the liner 132 and the separator co-operating fluid conductor 106, and (ii) the sealing, or substantially sealing, engagement between the separator sealing surface 156 and the liner 132, is with effect that fluid, that is being conducted in a downhole direction within the intermediate fluid passage 126, is directed to the second inlet port 120.

Figure 2:
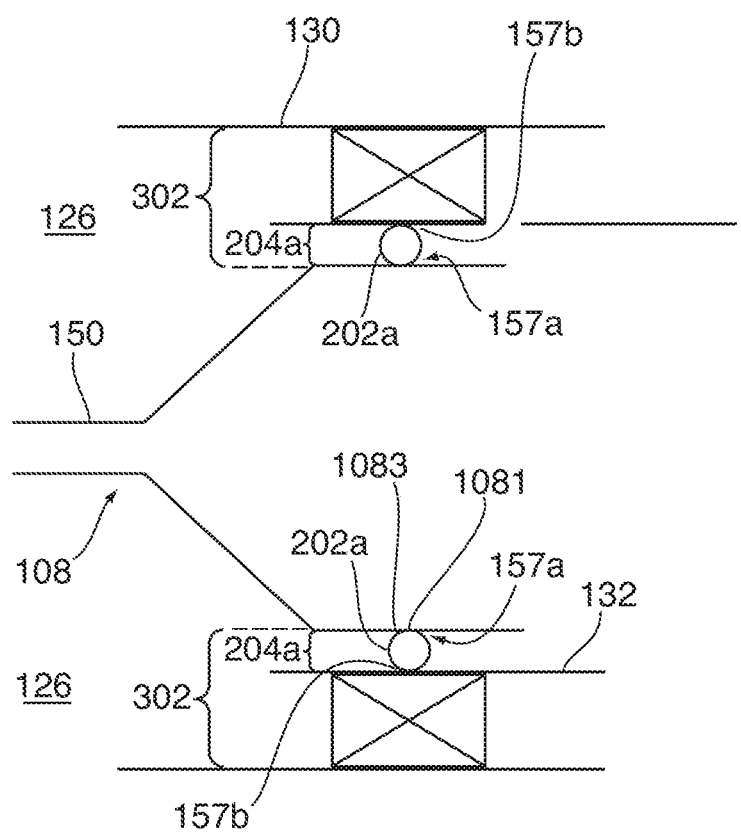
FIG. 2 is an enlarged view of the sealing engagement of the separator to the liner, illustrated in FIG. 1.
Figure 3:
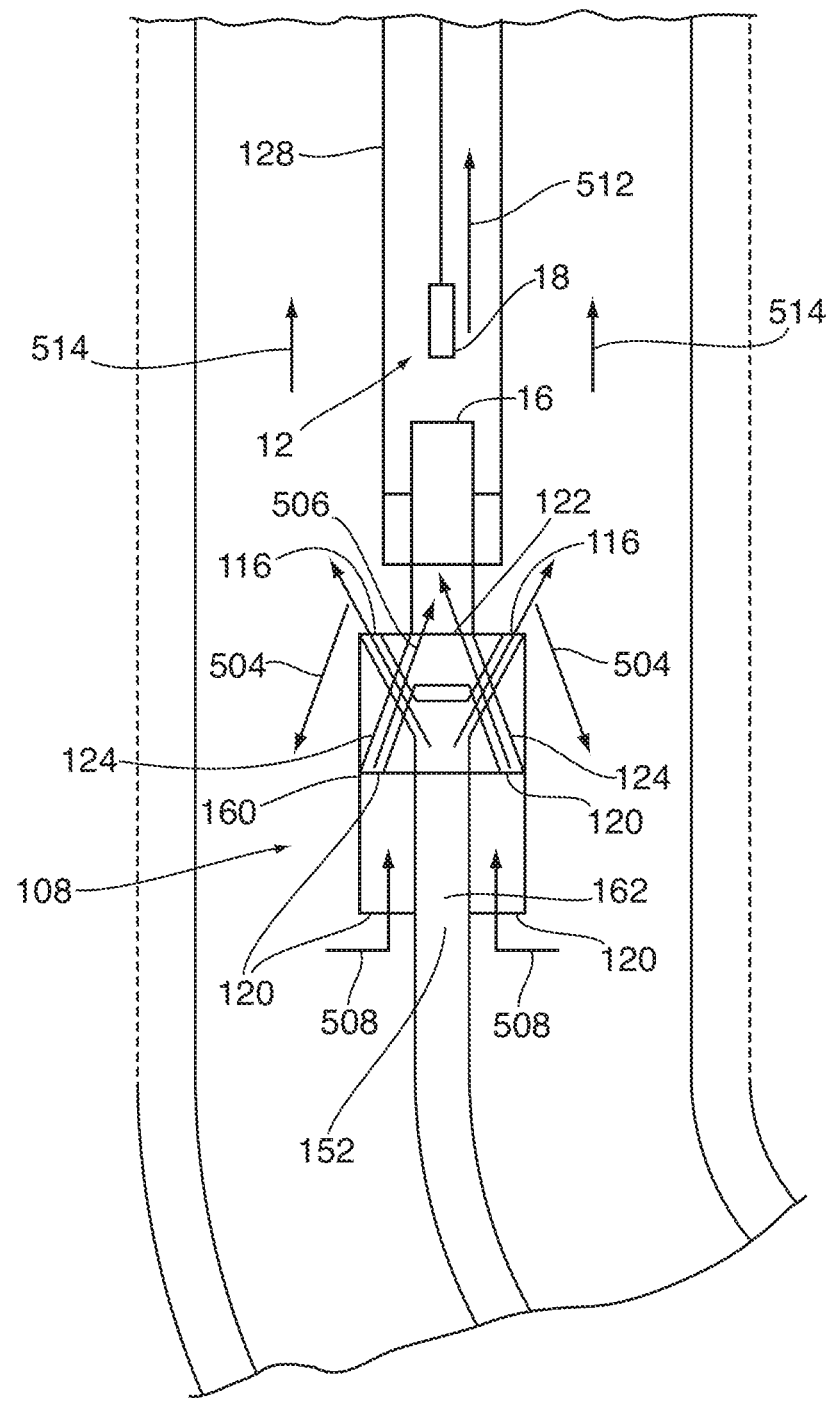
FIG. 3 is an enlarged view of Detail "A" in FIG. 1, illustrating an embodiment of a flow diverter.
Figure 4:
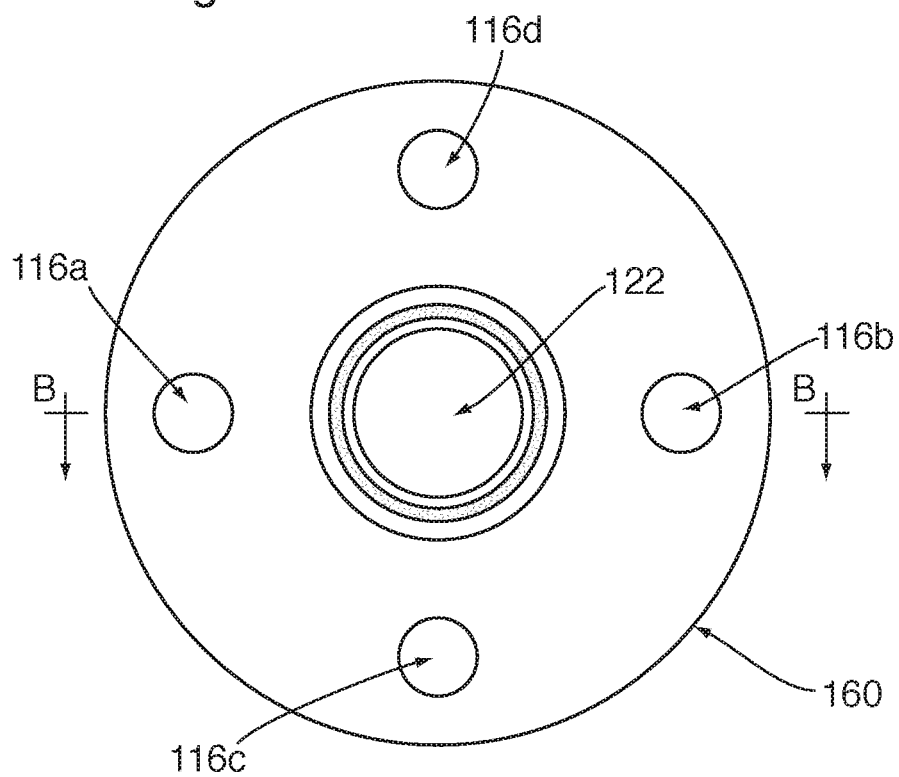
FIG. 4 is a top plan view of an embodiment of a flow diverter.
Figure 5:
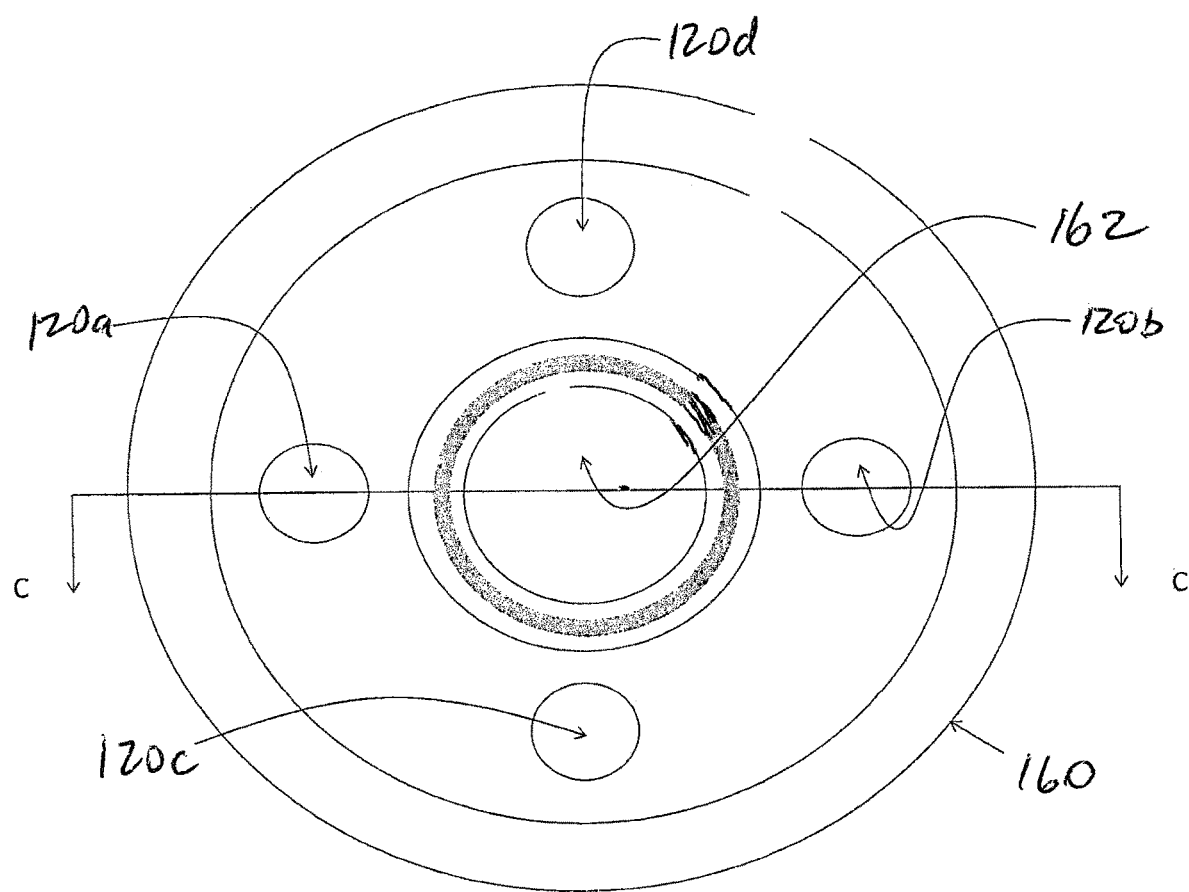
FIG. 5 is a bottom plan view of the flow diverter illustrated in FIG. 4.
Figure 6:
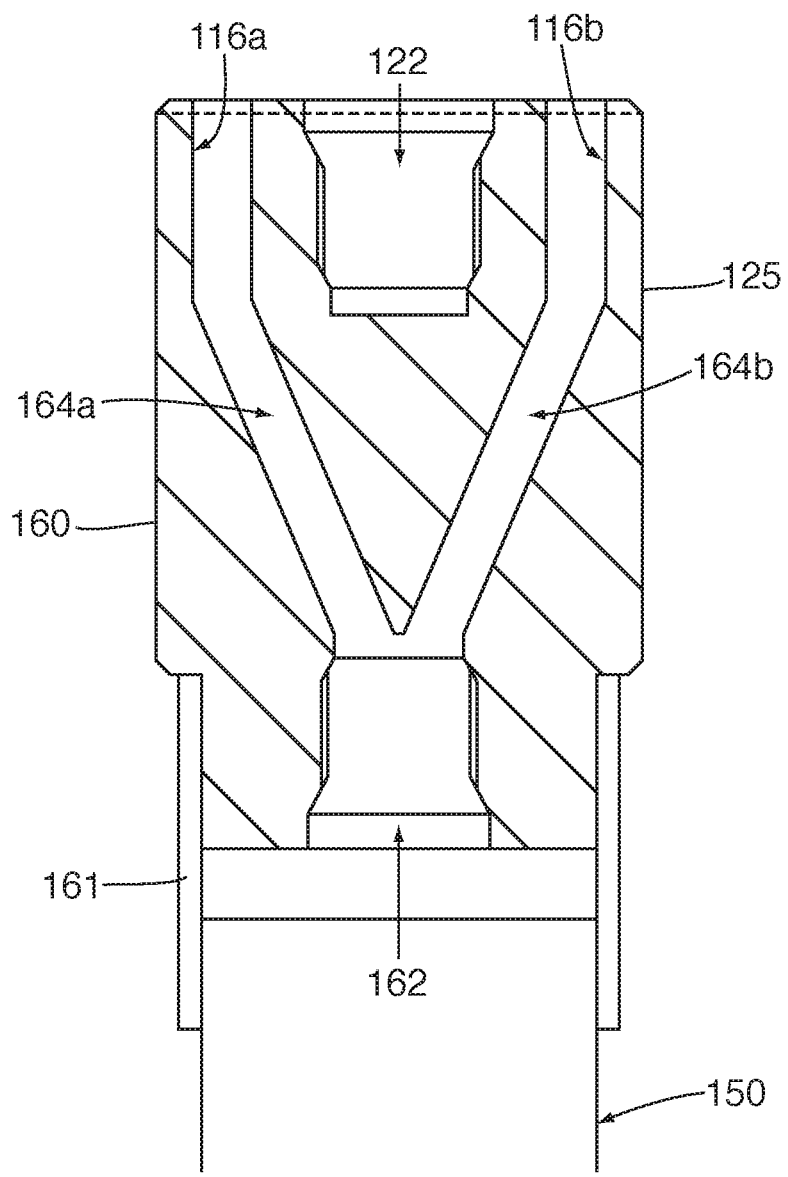
FIG. 6 is a sectional elevation view, taken along lines B-B in FIG. 4, of the flow diverter illustrated in FIG. 4.
Figure 7:
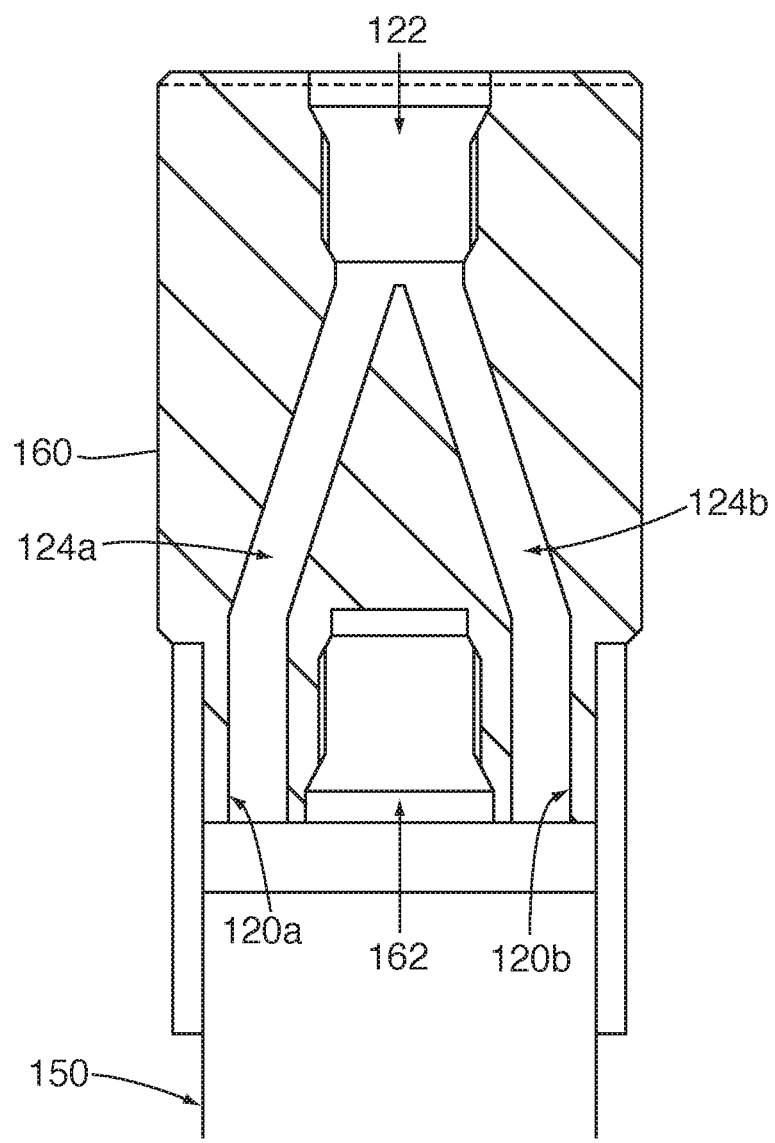
FIG. 7 is a sectional elevation view, taken along lines C-C in FIG. 6, of the flow diverter illustrated in FIG. 4.

Referring to FIG. 2, in related aspects, the separator 108 includes (or carries) a sealing member 202, and the sealing member 202 is disposed between a sealing member engaging surface portion 157a of the separator 108 and the sealing member engaging surface portion 157b of the liner 132 for effecting sealing, or substantial sealing, of the sealing member engaging portion 157a of the separator 108 relative to the sealing member engaging portion 157b of the liner 132. The combination of at least: (i) the sealing, or substantially sealing, engagement between the liner 132 and the wellbore casing 130, and (ii) the sealing, or substantial sealing, of the sealing member-engaging surface portion 157a of the separator 108 relative to the sealing member-engaging surface portion 157b of the liner 132, effects the sealing, or substantially sealing, disposition of the separator 108 (and, more specifically, the sealing member-engaging surface portion 157a of the separator 108) relative to the separator co-operating fluid conductor 106 and thereby defines a sealed interface 302. The sealing, or substantially sealing, disposition of the separator sealing member engaging surface portion 157a of the separator 108 relative to the separator co-operating fluid conductor 106 is effected downhole relative to the second inlet port 120. Further, this sealing, or substantially sealing, disposition is such that fluid flow, across the sealed interface 302, is prevented or substantially prevented.

In a related aspect, the sealing member 202, having an exposed surface portion 202a, that is disposed in fluid communication with the intermediate fluid passage 126, is extending across a gap 204a, between the separator 108 and the liner 132, having a minimum distance of less than 2.5 millimitres. In some embodiments, for example, the gap 204a has a minimum distance of less than one (1.0) millimetre.

In another related aspect, the inlet port 114 is disposed in fluid communication with the liner fluid passage 134 and in sealing, or substantially sealing, engagement with the liner 132 to prevent, or substantially prevent, the at least reservoir fluid from bypassing the inlet port 114.

Referring to FIG. 8, in another aspect, a separator sealing surface 156 is disposed in sealing, or substantially sealing, engagement with a constricted portion 138 of wellbore casing 130, such that the sealing, or substantially sealing, disposition of the separator sealing surface 156 relative to the separator co-operating fluid conductor 106 is effected by the sealing, or substantially sealing, engagement of the separator sealing surface 156 with the constricted portion 138 and defines a sealed interface 304. The sealing, or substantially sealing, engagement of the separator sealing surface 156 with the constricted portion 138 is effected downhole relative to the second inlet port 120 and is with effect that fluid flow, across the sealed interface 304, is prevented, or substantially prevented. In some embodiments, for example, the separator 108 is disposed in an interference fit with the constricted portion 138. In some embodiments, the constricted portion 138 of wellbore casing 130 includes an inwardly extending projection.

In some embodiments, for example, the sealing, or substantially sealing, engagement between the separator sealing surface 156 and the constricted portion 138 is with effect that fluid flow, across the sealed interface 304, in at least a downhole direction, is prevented, or substantially prevented.

In some embodiments, for example, the sealing, or substantially sealing, engagement between the separator sealing surface 156 and the constricted portion 138 is with effect that fluid, that is being conducted in a downhole direction within the intermediate fluid passage 126, is directed to the second inlet port 120.

Figure 9:
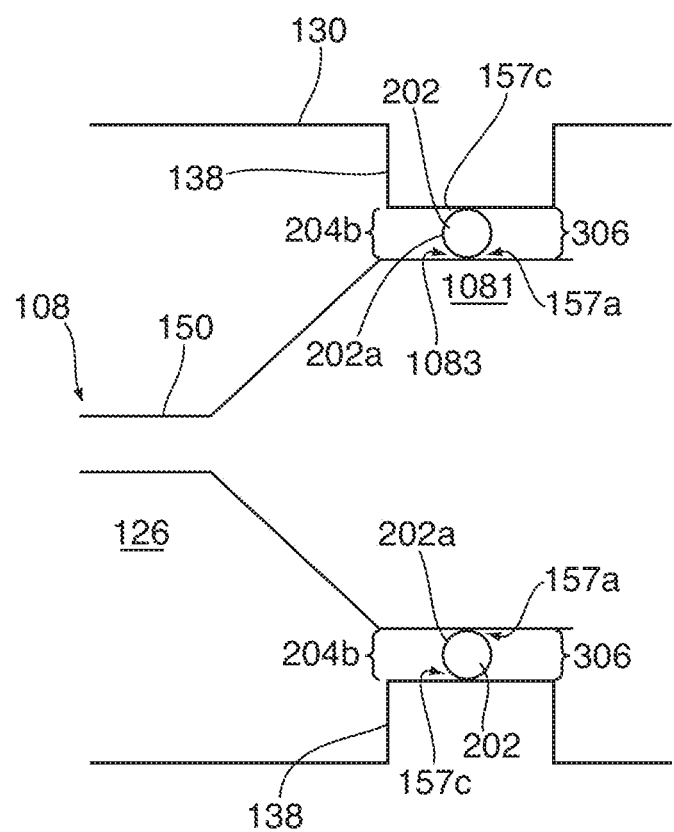
FIG. 9 is an enlarged view of the sealing engagement of the separator to a constricted portion of the wellbore wellbore casing, illustrated in FIG. 1.

Referring to FIG. 9, in a related aspect, the separator 108 includes (or carries) a sealing member 202, and the sealing, or substantially sealing, engagement between the separator sealing surface 156 and the constricted portion 138 is effected by the sealing member 202. In this respect, the sealing member 202 is disposed between a sealing member engaging surface portion 157a of the separator 108 and a sealing member engaging portion 157c of the constricted portion 138 such that a sealed interface 306 is thereby defined, and such that fluid flow, across the sealed interface 306, is prevented, or substantially prevented. The sealing member 202, having an exposed surface portion 202a, that is disposed in fluid communication with the intermediate fluid passage 126, is extending across a gap 204b, between the separator 208 and the constricted portion 138, having a minimum distance of less than 2.5 millimetres. In some embodiments, for example, the gap 204b has a minimum distance of less than one (1) millimetre.

The above-described configurations for sealing, or substantially sealing, disposition of the separator 108 relative to the separator co-operating fluid conductor 106 provide for conditions which minimize solid debris accumulation in the joint between the separator 108 and the separator co-operating fluid conductor 106. By providing for conditions which minimize solid debris accumulation within the joint, interference to movement of the separator 108 relative to the separator co-operating fluid conductor 106, which could be effected by accumulated solid debris, is mitigated.

In another aspect, the space, between: (a) the second inlet port 120 of the separator 108, and (b) the sealed interface (such as of sealed interface 300, 302, 304, or 306), defines a sump 206 for collection of solid particulate that is entrained within fluid being discharged from the first outlet port 116 of the separator 108, and the sump 206 has a volume of at least 0.1 m³. In some embodiments, for example, the volume is at least 0.5 m³. In some embodiments, for example, the volume is at least 1.0 m³. In some embodiments, for example, the volume is at least 3.0 m³.

In a related aspect, the space, between: (a) the second inlet port 120 of the separator 108, and (b) the sealed interface (such as sealed interface 300, 302, 304, or 306), defines a sump 206 for collection of solid particulate that is entrained within fluid being discharged from the first outlet port 116 of the separator 108, and the minimum separation distance between: (a) the second inlet port 120 of the separator 108, and (b) the sealed interface (such as sealed interface 300, 302, 304, or 306), measured along a line parallel to the axis of the fluid passage of the wellbore fluid conductor 100, is at least 30 feet, is at least 30 feet. In some embodiments, for example, the minimum separation distance is at least 45 feet. In some embodiments, for example, the minimum separation distance is at least 60 feet.

Figure 15:
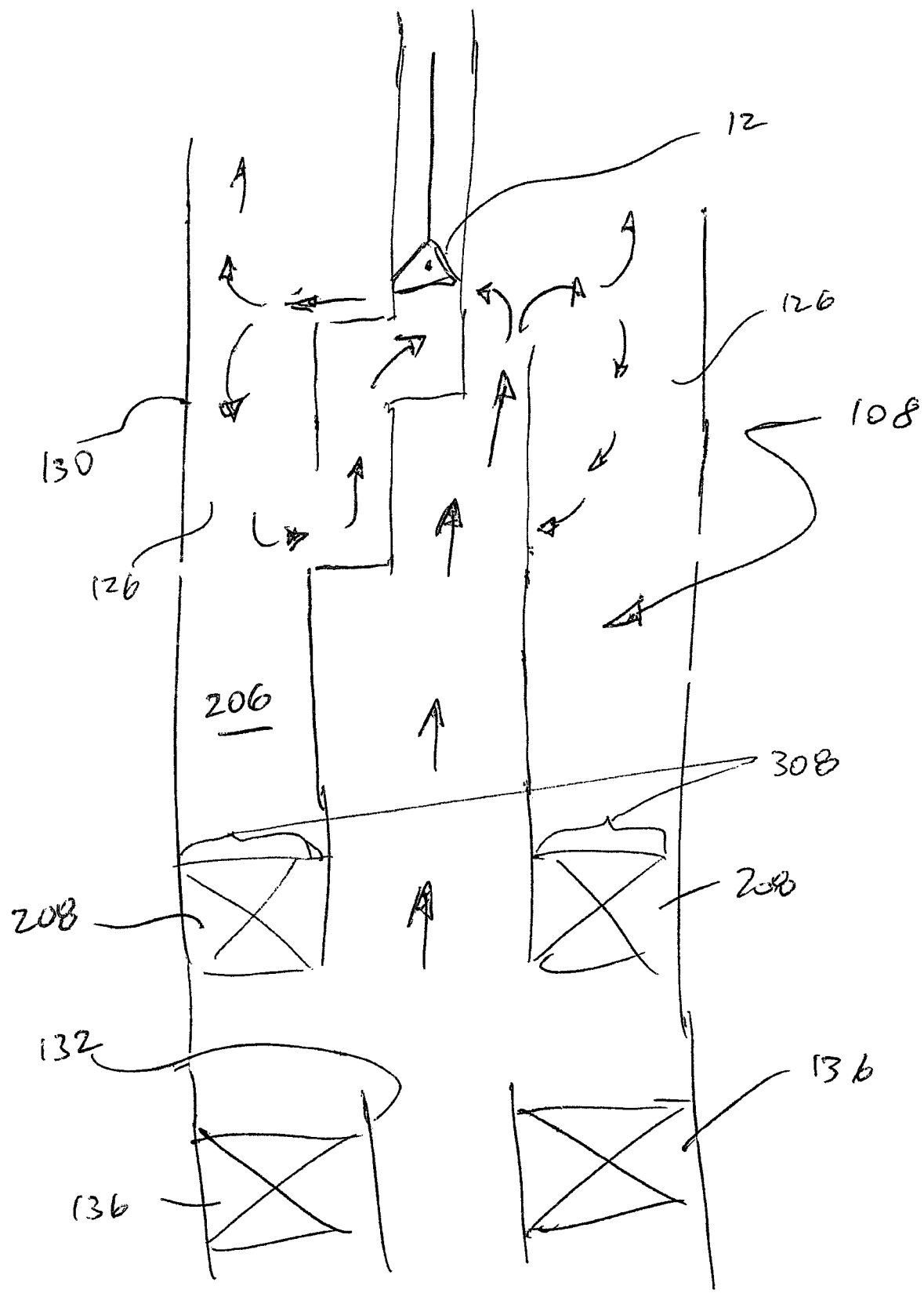
FIG. 15 is a schematic illustration of another embodiment of a system of the present disclosure using a downhole pump.

Referring to FIG. 15, in some of these embodiments, for example, the wellbore fluid conductor 100 includes the wellbore casing 130, and the wellbore casing 130 includes the separator co-operating fluid conductor 106, and the sealing, or substantially sealing, disposition of the separator 108 relative to the separator co-operating fluid conductor 106 is effected by at least a packer 208 disposed between the separator 108 and the wellbore casing 130. In some of these embodiments, for example, the packer 208 is carried by the separator 108. In some of these embodiments, for example, the packer 208 is disposed downhole relative to the second inlet port 120. In some of these embodiments, for example, the wellbore fluid conductor further includes a liner 132, the liner 132 being connected or coupled to (such as, for example, by being hung from the wellbore casing 130), and being disposed in sealing, or substantially sealing, engagement with the wellbore casing 130 such that the above-described sealed interface is defined (as sealed interface 308). The liner 132 includes a liner fluid passage 134, such that the downhole wellbore fluid conductor fluid passage 112 includes the liner fluid passage 134, and such that the first inlet port 114 is disposed for receiving at least reservoir fluids via the liner fluid passage 134. In some of these embodiments, for example, the sealing, or substantially sealing, engagement between the liner and the wellbore casing is with effect that fluid flow, across the sealed interface 308, at least in a downhole direction, is prevented or substantially prevented at the sealing engagement. In some of these embodiments, for example, the sealing, or substantially sealing, engagement between the liner 132 and the wellbore casing 130 is effected by a packer 136 disposed between the liner 132 and the wellbore casing 130.

Referring to FIG. 1, in some of these embodiments, for example, the separator co-the liner 132 is connected or coupled to (such as, for example, being hung from) the separator co-operating fluid conductor 106 and disposed in sealing, or substantially sealing, engagement with the separator co-operating fluid conductor 106, and including a liner fluid passage 134, such that the downhole wellbore fluid passage 112 includes the liner fluid passage 134. The separator 108 is disposed in sealing, or substantially sealing engagement with the liner 132. As discussed above, the sealing, or substantially sealing, disposition of the separator 108 relative to the separator co-operating fluid conductor 106 is effected by at least: (a) the sealing, or substantially sealing, engagement of the liner 132 with the separator co-operating fluid conductor 106, and (b) the sealing, or substantially sealing, engagement of the separator 108 with the liner 132. The first inlet port 114 is disposed for receiving at least reservoir fluid via the liner fluid passage 134. In some embodiments, for example, the separator 108 further includes a latch seal assembly 200 releasably coupled to the liner 132, wherein the sealing, or substantially sealing, engagement between the liner 132 and the separator 108 is effected by the latch seal assembly 200. In some embodiments, for example, the sealing, or substantially sealing, engagement between the liner 132 and the separator co-operating fluid conductor 106 is effected by a packer 136 disposed between the liner 132 and the separator co-operating fluid conductor 106.

Referring to FIG. 8, in some of these embodiments, for example, and as discussed above, the separator co-operating fluid conductor 106 includes a constricted portion 138, and the separator 108 is disposed in sealing, or substantially sealing, engagement with the constricted portion 138, such that the sealing, or substantially sealing, disposition of the separator 108 relative to the separator co-operating fluid conductor 106 is effected by at least the sealing, or substantially sealing, engagement of the separator 108 with the constricted portion 138. In some embodiments, for example, the sealing, or substantially sealing, engagement between the separator 108 and the constricted portion 136 is effected by at least a sealing member 202 that is carried by the separator 108. In some embodiments, for example, the separator 108 is disposed in an interference fit relationship with the constricted portion 138.

By providing for a sump 206 having the above-described volumetric space characteristic, and/or the above-described minimum separation distance characteristic, a suitable space is provided for collecting relative large volumes of solid debris, such that interference by the accumulated solid debris with the production of oil through the system is mitigated. This increases the run-time of the system before any maintenance is required. As well, because the solid debris is deposited over a larger area, the propensity for the collected solid debris to interfere with movement of the separator 108 relative to the separator co-operating fluid conductor 106, such as during maintenance (for example, a workover) is reduced.

In further related aspects, a separator 108 is provided for effecting separation of materials from reservoir fluid within a wellbore fluid conductor 100 disposed within a wellbore. The wellbore fluid conductor 100 including a separator co-operating fluid conductor 106, the separator co-operating fluid conductor 106 including a downhole wellbore fluid passage for receiving reservoir fluids from the reservoir and for conducting at least reservoir fluids. The separator 108 includes:

(a) a first inlet port 114 for receiving at least reservoir fluids from the downhole wellbore fluid passage 112;
(b) a first outlet port 116;
(c) a reservoir fluid-conducting passage 118 extending between the first inlet port 114 and the first outlet port 116;
(d) a second inlet port 120, positioned relative to the first outlet port 116 such that, when the separator 108 is disposed within the wellbore 14 and oriented for receiving at least reservoir fluids via the first inlet port 114, the second inlet port 120 is disposed downhole relative to the first outlet port 116;
(e) a second outlet port 112;

(f) a gas-depleted fluid conducting passage 124 extending between the second inlet port 120 and the second outlet port 122;

(g) a co-operating surface portion 125 configured for co-operating with the separator co-operating fluid conductor 106, when the separator 108 is disposed within the wellbore and oriented for receiving at least reservoir fluids via the first inlet port 114, to define an intermediate fluid passage 126 therebetween for effecting fluid communication between the first outlet port 116 and the second inlet port 120;

(h) a seal support portion 1081 having an outer surface 1083; and (i) a sealing member 202.

Referring to FIGS. 2 and 9, the sealing member 202 is supported by the seal support portion 1081. The sealing member 202 is configured for sealingly, or substantially sealingly, engaging the separator co-operating fluid conductor 106. The sealing member 202 is positioned relative to the second inlet port 120 such that, when the separator 108 is disposed within the wellbore 114 and oriented for receiving at least reservoir fluids via the first inlet port 114, the sealing member 202 is disposed downhole relative to the second inlet port 120 and in sealing, or substantially sealing, engagement with the separator co-operating fluid conductor 106.

In a first related aspect, the sealing member 202 is further configured such that, when the separator 108 is disposed within the wellbore 14 and oriented for receiving at least reservoir fluids via the first inlet port 114, and the sealing member 202 is sealingly, or substantially sealingly, engaged to the separator co-operating fluid conductor 106, the sealing member 202, having an exposed surface portion 202, that is disposed in fluid communication with the intermediate fluid passage 126, is extending across a gap, between the separator 108 and the separate co-operating fluid conductor 106, having a minimum distance of less than 2.5 millimetres. In some embodiments, for example, the gap has a minimum distance of less than one (1.0) millimetre.

In a second related aspect, the sealing member 202 projects outwardly from the outer surface 103 by a distance of less than 2.5 millimetres, such as less than one (1.0) millimetre. In some embodiments, for example, the sealing member 202 is retractable, such that, in the retracted state, the sealing member 202 projects outwardly from the outer surface 103, by a distance of less than 2.5 millimetres, such as less than one (1.0) millimetre (it is understood that, in an extended state, such sealing member may project outwardly more than 2.5 millimitres when there is no resistance to deployment of the sealing member).

In a third related aspect, the separator 108 further includes a latch seal assembly 200, carrying the sealing member 202, and co-operatively configured for releasable connection to the separate co-operating fluid conductor 106.

The above-described configurations for the sealing member 202 of the separator 108, provide for conditions which minimize solid debris accumulation in the joint between the separator 108 and a separator co-operating fluid conductor 106, when the separator 108 is installed downhole and coupled to the separator co-operating fluid conductor 106. By providing for conditions which minimize solid debris accumulation within the joint, interference to movement of the separator 108 relative to the separator co-operating fluid conductor 106, which could be effected by accumulated solid debris, is mitigated.

In the above description, for purposes of explanation, numerous details are set forth in order to provide a thorough understanding of the present disclosure. However, it will be apparent to one skilled in the art that these specific details are not required in order to practice the present disclosure. Although certain dimensions and materials are described for implementing the disclosed example embodiments, other suitable dimensions and/or materials may be used within the scope of this disclosure. All such modifications and variations, including all suitable current and future changes in technology, are believed to be within the sphere and scope of the present disclosure. All references mentioned are hereby incorporated by reference in their entirety.

What is claimed is:

1. A system for processing at least reservoir fluids within a wellbore that is disposed within an oil reservoir, the system comprising:
   a fluid conductor disposed within the wellbore, and including a downhole wellbore fluid passage for receiving reservoir fluids from the reservoir and for conducting at least reservoir fluids;
   a separator including:
      a first inlet port disposed in fluid communication with the downhole wellbore fluid passage for receiving at least reservoir fluids from the downhole wellbore fluid passage;
      a first outlet port;
      a reservoir fluid-conducting passage extending between the first inlet port and the first outlet port;
      a second inlet port disposed downhole relative to the first outlet port;
      a second outlet port;
      a gas-depleted fluid conducting passage extending between the second inlet port and the second outlet port; and
      an exterior surface co-operating with the fluid conductor to define an intermediate fluid passage therebetween for effecting fluid communication between the first outlet port and the second inlet port;
      wherein the separator is sealingly, or substantially sealingly, disposed relative to the fluid conductor to define a sealed interface, and the sealing disposition is effected downhole relative to the second inlet port, with effect that fluid flow, across the sealed interface, is prevented, or substantially prevented;
   and wherein the space, between: (a) the second inlet port of the separator, and (b) the sealed interface, defines a sump for collection of solid particulate that is entrained within fluid being discharged from the first outlet port of the separator, and the space has a volume of at least 0.1 m³.

2. The system as claimed in claim 1;
   wherein the sealing, or substantially sealing, disposition of the separator relative to the fluid conductor is with effect that fluid flow, across the sealed interface, in at least a downhole direction, is prevented, or substantially prevented.

3. The system as claimed in claim 1;
   wherein the sealing, or substantially sealing, disposition of the separator relative to the fluid conductor is with effect that fluid, that is being conducted in a downhole direction within the intermediate fluid passage, is directed to the second inlet port.

4. The system as claimed in claim 1;
   wherein the first inlet port of the separator is disposed downhole relative to the second outlet port of the separator.

5. The system as claimed in claim 1;
   wherein the sealing, or substantially sealing, disposition of the separator relative to the fluid conductor is effected by at least a packer disposed between the separator and the separate co-operating fluid conductor.

6. The system as claimed in claim 5; wherein the packer is carried by the separator.

7. The system as claimed in claim 6; wherein the packer is disposed downhole relative to the second inlet port.

8. The system as claimed in claim 1, further comprising: a pump connected to the separator for pressurizing fluid supplied from the gas-depleted fluid conducting passage.

9. The system as claimed in claim 1; wherein the fluid conductor includes a wellbore string.

10. The system as claimed in claim 1; wherein the fluid conductor includes a casing.

11. A system for processing at least reservoir fluids within a wellbore that is disposed within an oil reservoir, the wellbore including a wellbore fluid conductor having a fluid passage, the wellbore fluid conductor comprising:
a fluid conductor disposed within the wellbore, and including a downhole wellbore fluid passage for receiving reservoir fluids from the reservoir and for conducting at least reservoir fluids;
a separator including:
a first inlet port disposed in fluid communication with the downhole wellbore fluid passage for receiving at least reservoir fluids from the downhole wellbore fluid passage;
a first outlet port;
a reservoir fluid-conducting passage extending between the first inlet port and the first outlet port;
a second inlet port disposed downhole relative to the first outlet port;
a second outlet port;
a gas-depleted fluid conducting passage extending between the second inlet port and the second outlet port; and
an exterior surface co-operating with the fluid conductor to define an intermediate fluid passage therebetween for effecting fluid communication between the first outlet port and the second inlet port;
wherein the separator is sealingly, or substantially sealingly, disposed relative to the fluid conductor to define a sealed interface, and the sealing, or substantially sealing disposition is effected downhole relative to the second inlet port, with effect that fluid flow, across the sealed interface, is prevented, or substantially prevented;
and wherein the space, between: (a) the second inlet port of the separator, and (b) the sealed interface, defines a sump for collection of solid particulate that is entrained within fluid being discharged from the first outlet port of the separator, and the minimum separation distance between: (a) the second inlet port of the separator, and (b) the sealed interface, measured along a line parallel to the axis of the fluid passage of the wellbore fluid conductor, is at least 30 feet.

12. The system as claimed in claim 11; wherein the sealing, or substantially sealing, disposition of the separator relative to the fluid conductor is with effect that fluid flow, across the sealed interface, in at least a downhole direction, is prevented, or substantially prevented.

13. The system as claimed in claim 11; wherein the sealing, or substantially sealing, disposition of the separator relative to the separator co-operating fluid conductor is with effect that fluid, that is being conducted in a downhole direction within the intermediate fluid passage, is directed to the second inlet port.

14. The system as claimed in claim 11; wherein the first inlet port of the separator is disposed downhole relative to the second outlet port of the separator.

15. The system as claimed in claim 11; wherein the sealing, or substantially sealing, disposition of the separator relative to the fluid conductor is effected by at least a packer disposed between the separator and the separator co-operating fluid conductor.

16. The system as claimed in claim 15; wherein the packer is carried by the separator.

17. The system as claimed in claim 16; wherein the packer is disposed downhole relative to the second inlet port.

18. The system as claimed in claim 11, further comprising:
a pump connected to the separator for pressurizing fluid supplied from the gas-depleted fluid conducting passage.

19. The system as claimed in claim 11; wherein the fluid conductor includes a wellbore string.

20. The system as claimed in claim 11; wherein the fluid conductor includes a casing.

* * * * *